United States Patent
Kokuryo et al.

(10) Patent No.: US 6,879,630 B2
(45) Date of Patent: Apr. 12, 2005

(54) AUTOMATIC EQUALIZATION CIRCUIT AND RECEIVER CIRCUIT USING THE SAME

(75) Inventors: Yoshiro Kokuryo, Tachikawa (JP); Nobuo Tsukamoto, Akishima (JP); Hiroyuki Hamazumi, Sagamihara (JP)

(73) Assignee: Hitachi Kokusai Electric Inc., Tokyo ( * ) Notice: Subject to any disclaimer, the term of this patent is extended or adjusted under 35 U.S.C. 154(b) by 703 days.

(21) Appl. No.: 09/822,272

(22) Filed: Apr. 2, 2001

(65) Prior Publication Data

US 2003/0165191 A1 Sep. 4, 2003

Related U.S. Application Data

(63) Continuation-in-part of application No. 09/819,709, filed on Mar. 29, 2001.

(30) Foreign Application Priority Data

Mar. 30, 2000 (JP) ........................................ 2000-094670
Apr. 3, 2000 (JP) ........................................ 2000-101622

(51) Int. Cl.[7] .......................... H04L 27/06; H04L 27/14; H04L 27/22; G06F 17/10
(52) U.S. Cl. ........................ 375/231; 375/316; 708/323
(58) Field of Search ................................ 375/229–232, 375/235, 285, 295, 345; 455/306; 714/708; 708/323

(56) References Cited

U.S. PATENT DOCUMENTS

| | | | | |
|---|---|---|---|---|
| 3,757,221 A | * | 9/1973 | Moehrmann | 375/232 |
| 4,638,495 A | * | 1/1987 | Mizoguchi | 375/232 |
| 4,736,388 A | * | 4/1988 | Eguchi | 375/285 |
| 4,811,360 A | | 3/1989 | Potter | |
| 4,868,850 A | * | 9/1989 | Kaku et al. | 375/231 |
| 4,926,499 A | * | 5/1990 | Kobayashi et al. | 455/306 |
| 5,432,794 A | * | 7/1995 | Yaguchi | 714/708 |
| 5,550,596 A | * | 8/1996 | Strolle et al. | 348/607 |
| 5,598,432 A | * | 1/1997 | Wei | 375/229 |
| 5,914,982 A | * | 6/1999 | Bjarnason et al. | 375/222 |
| 6,014,407 A | * | 1/2000 | Hunsinger et al. | |
| 6,034,564 A | * | 3/2000 | Iwamatsu | 329/306 |
| 6,522,702 B1 | * | 2/2003 | Maruyama | 375/324 |
| 2002/0027952 A1 | * | 3/2002 | Kokuryo et al. | 375/230 |
| 2002/0054649 A1 | * | 5/2002 | Kokuryo et al. | 375/295 |

FOREIGN PATENT DOCUMENTS

WO 9950969 10/1999

* cited by examiner

*Primary Examiner*—Amanda T. Le
*Assistant Examiner*—Lawrence B. Williams
(74) *Attorney, Agent, or Firm*—Mattingly, Stanger, Malur & Brundidge, P.C.

(57) ABSTRACT

A demodulation circuit for demodulating a multilevel digital modulation signal. Only an in-phase or quadrature component of the training signal generated in the demodulation circuit is used for equalization convergence. Tap coefficients of an equalizing training equalizer are updated by supplying either the in-phase or quadrature component so that the calculation amount can be reduced. When the equalization convergence is established, the obtained tap coefficients are rotated in phase and set to a data reproduction equalizer.

18 Claims, 17 Drawing Sheets

⊙ SIGNAL POINT OF TRAINING SIGNAL

O SIGNAL POINT OF TRAINING SIGNAL

US 6,879,630 B2

AUTOMATIC EQUALIZATION CIRCUIT AND RECEIVER CIRCUIT USING THE SAME

CROSS-REFERENCE TO RELATED APPLICATION

This is a continuation-in-part of U.S. application Ser. No. 09/819,709, filed on Mar. 29, 2001 in the names of Kokuryo Yoshiro, Nobuo Tsukamoto and Hiroyuki Hamazumi, entitled "AUTOMATIC EQUALIZATION CIRCUIT AND RECEIVER CIRCUIT USING THE SAME", assigned to the same assignee of the present application and claiming the priority right based on Japanese patent application No. 2000-94670 filed on Mar. 30, 2000, the disclosures of which is hereby incorporated by reference herein.

BACKGROUND OF THE INVENTION

The present invention relates to an equalization circuit to be used in a demodulation circuit for demodulating a multilevel digital modulation signal, and more particularly to an automatic equalization circuit of the type that equalization characteristics, i.e., frequency characteristics, are automatically set by using a training signal, and to a receiver circuit (demodulation circuit) using such an automatic equalization circuit.

It is desired in every and each transmission system including a multilevel digital transmission system that waveform distortions, echoes and the like be as small as possible. It is known that an automatic equalizer is used in a demodulation circuit (receiver circuit) for demodulating a modulation signal of a multilevel digital modulation type. Examples of using an automatic equalizer are disclosed, for example, in Shahid U. H. Qureshi, "Adaptive Equalization", Proceedings of the IEEE, Vol. 73, No. 9, September 1985, pages 1349 and 1355, Kazuo Murano and Shigeyuki Unakami, "Digital Signal Processing in Information/Communication", Shokodo, Nov. 25, 1987, page 57, FIG. 2.24, and The Institute of Electronics and Communication Engineers, "Application of Digital Signal Processing", The Institute of Electronics and Communication Engineers of Japan, May 20, 1981, page 150, FIG. 6.1 and page 171, FIG. 6.21.

An example of an automatic equalization circuit used in a conventional demodulation circuit of such a multilevel digital modulation type will be described with reference to the block diagram of FIG. 11 showing the overall structure of a demodulation circuit (receiver circuit) of a multilevel digital modulation type.

In the demodulation circuit shown in FIG. 11, a received modulated signal having a carrier frequency of f is inputted to an analog BPF (band-pass filter) 1 whereat the bandwidth of the received modulated signal is limited. Then, at an AGC (automatic gain control) circuit 2, the level of the received signal is changed to a predetermined level irrespective of its signal level when received. This signal is then inputted to an A/D converter (analog to digital converter) 3 to be converted into a digital signal and supplied to a reception power calculator 4 and multipliers 5.

At the reception power calculator 4, the level of the received signal is calculated in accordance with the digital signal outputted from the A/D converter 3, and fed back to a control input of the AGC circuit 2. A digital signal having a predetermined level can therefore be inputted to the A/D converter 3.

The digital signal inputted to the multipliers 5 is multiplied by a carrier signal having a frequency of f and supplied from a sine-wave generator 7 to obtain an in-phase component (I component) signal and a quadrature component (Q component) signal.

More specifically, the multipliers 5 perform quadrature demodulation by generating the in-phase component (I component) signal through multiplication by a sine-wave signal $\cos(\omega t)$ directly supplied from the sine wave generator 7 and the quadrature component (Q component) signal through multiplication by a carrier signal $\sin(\omega t)$ obtained by shifting the sine-wave signal $\cos(\omega t)$ from the sine wave generator 7 by $\pi/2$ at a phase shifter 6, where $\omega$ is $2\pi f$.

The waveforms of the in-phase component (I component) signal and quadrature component (Q component) signal outputted from the multipliers 5 are waveform shaped by roll-off filters (ROFs) 8. The shaped signals outputted from ROFs 8 are supplied to an equalizer 9. The equalization characteristics of the equalizer 9 can be set by setting tap coefficient values to the equalizer 9.

Data signals Ia and Qa equalized by the equalizer 9 are inputted to an identifier 10 which identifies a transmission point on the transmission side. This identification result is outputted as data signals Id and Qd which are converted into a serial signal at a P/S converter (parallel-in serial-out shift register) 11 to obtain demodulated data.

The equalizer 9 equalizes a received signal to eliminate the influence of waveform distortions, echoes and the like received on a transmission path. To this end, predetermined equalization characteristics are set beforehand to the equalizer 9.

The equalizer 9 is generally designed to carry out an operation with a complex number comprised of an in-phase component and quadrature component. An example of the equalizer 9 will be described with reference to FIG. 5.

The equalizer 9 shown in FIG. 5 has two adders 201 and four transversal filters 202.

Each of the transversal filters 202 of the equalizer 9 is generally constituted by (N-1) delay elements 2021, N multipliers 2022 and a summing unit 2023 as shown in FIG. 6. The equalization characteristics of the equalizer 9 can be set by tap coefficients C1 to CN to be set to the multipliers 2022.

Assuming that tap coefficient vectors of the transversal filters 202 are represented by Cbi and Cbq and that input vectors set in a time domain for respective delay times of the delay elements 2021 are represented by Ir and Qr, then the relation between an input signal complex number $(Ir + j \cdot Qr)$ and the tap coefficient vectors Cbi and Cbq is given by:

$$(Ir+j \cdot Qr) \cdot (Cbi+j \cdot Cbq) = (Ir \cdot Cbi - Qr \cdot Cbq) + j \cdot (Ir \cdot Cbq + Qr \cdot Cbi)$$

The values of output signals Ia and Qa can therefore be given by the following equations by using the input signal vectors Ir and Qr and tap coefficient vectors Cbi and Cbq:

$$Ia = Ir \cdot Cbi - Qr \cdot Cbq$$

$$Qa = Ir \cdot Cbq + Qr \cdot Cbi$$

By changing the tap coefficient vectors Cbi and Cbq, the transmission characteristics, i.e., characteristics between the input signals Ir and Qr and output signals Ia and Qa can be changed.

The equalization characteristics of an equalization circuit are set in the following manner. A signal called a training signal having a predetermined format is preset as a standard or reference signal. Prior to a transmission start of a data signal, this training signal is transmitted from the transmission apparatus side to the reception apparatus side. By using the training signal, the equalization characteristics are set and thereafter, the data signal is transmitted.

Generally, the training signal is formed by generating signal points of a two-level modulate point pair in a baseband having a PN pattern such as M-sequence and then quadrature modulating them.

Two signal points of the two-level modulate point pair are selected from signal points on the constellation plane for data signals, the two signal points having the same power as the average power of data signals, or two signal points not used by data signals are newly generated. Also in the latter case, the two signal points having the same power as the average power of data signals are selected.

An example of the former case will be described by taking as an example a 16 QAM system. As shown in FIG. 8, two signal points A (+3, +1) and B(−3, −1) are used as the training signal. In this case, the average power of data signals is $((1^2+1^2)+2\times(1^2+3^2)+(3^2+3^2))/4=10$, assuming that each signal point is transmitted at the same probability. This average power of 10 is equal to the average power $(3^2+1^2)=10$ of A and B.

An example of the latter case will be described by taking as an example a 16 QAM system. As shown in FIG. 9, two new signal points C $(+\sqrt{10}, 0)$ and D$(-\sqrt{10}, 0)$ are used to form the training signal. In this case, since the average power of data signals is 10, the amplitude of C and D is set to $\sqrt{10}$ to make the average power equal to 10.

In the latter case, the modulation circuit requires a specific circuit for the training signal and not for the data signal, whereas in the former case using the same signal points as those of data signals, the circuit scale can be reduced. For this reason, the former case is often adopted.

When the training signal is received, the reception apparatus side compares the received training signal with a training signal generated by a training signal generator 18. In accordance with a difference therebetween, the tap coefficients of the equalizer 9 are sequentially changed. When the difference becomes smallest, the equalizer 9 enters the condition capable of equalizing distortions on the transmission path.

For this operation, as shown in FIG. 11, a training signal synchronization detector 12, switches 16-3' and adders 17-1 are provided.

The training signal synchronization detector 12 may be a correlator. A PN pattern of M-sequence is generally used for the training signal. A part of this PN pattern is used as the coefficients of the correlator, and the output signals Ir and Qr of the roll-off filters 8 are inputted to the correlator to calculate a correlation value. When the patterns are coincident, a large correlation value is outputted, whereas when there is no correlation, i.e., when the patterns are not coincident, a small correlation value is outputted. An output of the correlator is inputted to a comparator (not shown) to compare it with a predetermined threshold value. When the correlation value exceeds the threshold value, it can be judged that a specific pattern of the training signal was received. Since the position of the specific pattern in the training signal can be known in advance, the frame structure of a received signal can be known so that the start position of the training signal in the next frame can be known.

As the training signal is received and this is detected by the training signal synchronization detector 12, the switches 16-3' are turned to the contact b side to supply the detection signal to a tap coefficient updating unit 15 to start changing the equalization characteristics in the manner described above.

During the period while the training signal transmitted from the transmission apparatus side is detected on the reception apparatus side, the output signals Ia and Qa of the equalizer 9 are supplied to the adders 17-1 whereas the training signals It and Qt, which are generated by a training signal generator 18, having the same format as the training signals generated on the transmission apparatus side are supplied to the subtraction inputs of the adders 17-1.

The adders 17-1 output equalization error signals Ei and Eq representative of differences between the output signals Ia and Qa of the equalizer 9 and the reference training signals It and Qt. The equalization error signals Ei and Eq outputted from the adders 17-1 are inputted to the tap coefficient updating unit 15 to sequentially update the tap coefficients of the equalizer 9 in accordance with an equalization algorithm using a predetermined least mean sequare method.

These tap coefficients correspond to the coefficients C1 to CN applied to the N multipliers 2022 shown in FIG. 6. The equalized output signals Ia and Qa can be obtained by updating these tap coefficients C1 to CN in accordance with the following equations so as to minimize the equalization error value E:

$$CN^{(T+1)}=CN^{(T)}-g\cdot X^*\cdot E$$

$X^*$: complex conjugate number of input signal$=Ir-j\cdot Qr$

E: $Ebi+j\cdot Ebq=(Ia-Id)+j\cdot(Qa-Qd)$ g: constant (scalar)

$CN(T)$: tap coefficients C1 to CN at time T $CN^{(T+1)}$: tap coefficients C1 to CN at time T+1 where j is an imaginary part of a complex number.

An algorithm for setting equalization characteristics is well known in this field of art. The details thereof are disclosed, for example, in Hiroshi Miyakawa et al. "Digital Signal Processing", The Institute of Electronics and Communication Engineers of Japan, November, 1975, pp. 231–243.

A process of updating the tap coefficient values by the tap coefficient updating unit 15 is repetitively executed at a period of 1/modulation rate, that is symbol rate, so that the equalization errors Ei and Eq are gradually reduced and become near zero.

When the equalization errors Ei and Eq become sufficiently small, the optimum equalization characteristics can be obtained so that a signal received at the reception apparatus side can be equalized by the equalizer 9 to eliminate the influence of waveform distortions and the like which may be generated depending upon the transmission path condition, and data without errors can be reproduced.

After the optimum equalization characteristics are obtained on the reception apparatus side, the switches 16-3' are turned back to the contact a side to perform the transmission operation of a data signal. However, the transmission apparatus side has no means for knowing the completion of setting the equalization characteristics on the reception apparatus side.

Conventionally, the time taken for the reception apparatus side to set the equalization characteristics by using the training signal has been detected. After the lapse of this estimated time after the training signal was transmitted, the signal is stopped and the transmission operation of a data signal starts.

When the training signal is stopped, this is detected by the training signal synchronization detector 12. At this timing, the switches 16-3 are turned back to the contact a side.

Accordingly, the data signals Ia and Qa are thereafter inputted to the identifier 10 and the reception apparatus side moves to a normal data transmission operation wherein serial data signals are outputted from the P/S converter 11.

While the data signal is received during the data transmission process after the equalization characteristics of the equalizer are set, if the transmission path condition changes abruptly because of phase hit, amplitude hit, short break and the like, the equalizer 9 may become out of the equalization condition and may enter a so-called divergence condition.

In such a case, it is difficult to make the equalizer 9 enter the equalization condition by using the data signal without using the training signal. Even if the equalization condition could be recovered by some other means, it takes a very long time.

In such a case, if the data signal is stopped and instead the training signal is transmitted from the transmission apparatus side, the equalizer 9 in the reception apparatus side can be made the equalization condition. However, it is necessary for the transmission apparatus side to detect the divergence condition of the equalizer 9 in the reception apparatus side.

If data transmission is carried out bidirectionally, the divergence condition of the equalizer 9 can be notified from the reception apparatus side to the transmission apparatus side by using some means. However, if data transmission is carried out unidirectionally, this notification is impossible.

To solve this, conventionally, as shown in FIG. 10, the training signals DT and data signals DA are alternately transmitted at a predetermined period irrespective of the condition of the equalizer on the reception apparatus side. Upon reception of the training signal DT, the reception apparatus side executes the equalization setting process for the equalizer by using the training signal DT even if the equalizer is not in the divergence condition.

When the divergence of the equalizer occurs, the reception apparatus side cannot reproduce the data signal correctly, resulting in bit errors.

However, even if the divergence of the equalizer occurs during the data signal transmission, the training signal is always transmitted in a predetermined period. Therefore, upon reception of the next training signal, the equalization process is executed and the equalization condition can be recovered.

Therefore, according to this conventional automatic equalization technique, even if the divergence condition of the equalizer occurs, bit errors of data signals are generated only during the period from the occurrence of the divergence to the completion of setting the equalization characteristics by using the next training signal. After the training signal is received and the equalization condition is recovered, a data signal can be reproduced without errors.

The tap updating operation for making the equalizer enter the equalization condition by using the received training signal is required to be executed the number of symbols of the training signal. Generally, the number of symbols are several tens to several hundreds. One symbol corresponds to a signal at each signal point on the constellation plane of the baseband transmission signal. This symbol is modulated and transmitted at a predetermined period, i.e., a 1/modulation rate period.

However, with the above-described automatic equalization technique, the calculation amount becomes very large because the above-described equations are calculated for each tap and the input signal is represented by a complex number and has both the in-phase and quadrature amplitude components. If the tap coefficient updating is performed by using software, the process time becomes very long and the program itself becomes large, and if the tap coefficient updating is performed by using hardware, the circuit scale becomes very large.

SUMMARY OF THE INVENTION

It is an object of the present invention to provide an automatic equalization circuit and a reception circuit (demodulation circuit) using the automatic equalization circuit, capable of shortening the process time and reducing the size of programs if tap updating is performed by using software, and reducing the circuit scale if it is performed by using hardware, while the equalization convergence performance is retained.

In order to solve the above-described problems, the invention provides an automatic equalization circuit of the type that the equalization characteristics necessary for demodulating data signals are automatically updated in accordance with a received training signal, wherein only an in-phase component or quadrature component of a training signal generated in the automatic equalization circuit is used for comparing it with the received training signal, tap coefficients of the automatic equalization circuit are updated by using a reduced calculation amount of only the in-phase component or quadrature component, and when an equalization convergence is achieved, the phases of the tap coefficients are rotated.

Since a two-level training signal is symmetrical relative to a phase difference of $\pi$, a reference signal of only the in-phase component or quadrature component is generated when the training signal is received, and the tap coefficient updating is performed by using the reference signal. When the tap coefficient updating by using the training signal is completed, the phase of each tap coefficient is rotated. In this manner, the complex number or complex number calculation can be simplified, and the loads of the tap coefficient updating and filter calculations of the automatic equalization circuit can be reduced. When the tap coefficient updating is completed, the phase of each tap coefficient value is rotated to have the same phase as the original training signal. Received data signals can therefore be reproduced in a manner similar to a conventional manner.

BRIEF DESCRIPTION OF THE DRAWINGS

The foregoing and other objects, features and advantages of the invention will be apparent from the following more particular description of the preferred embodiments of the invention as illustrated in the accompanying drawings wherein.

DESCRIPTION OF THE EMBODIMENTS

Figure 1:
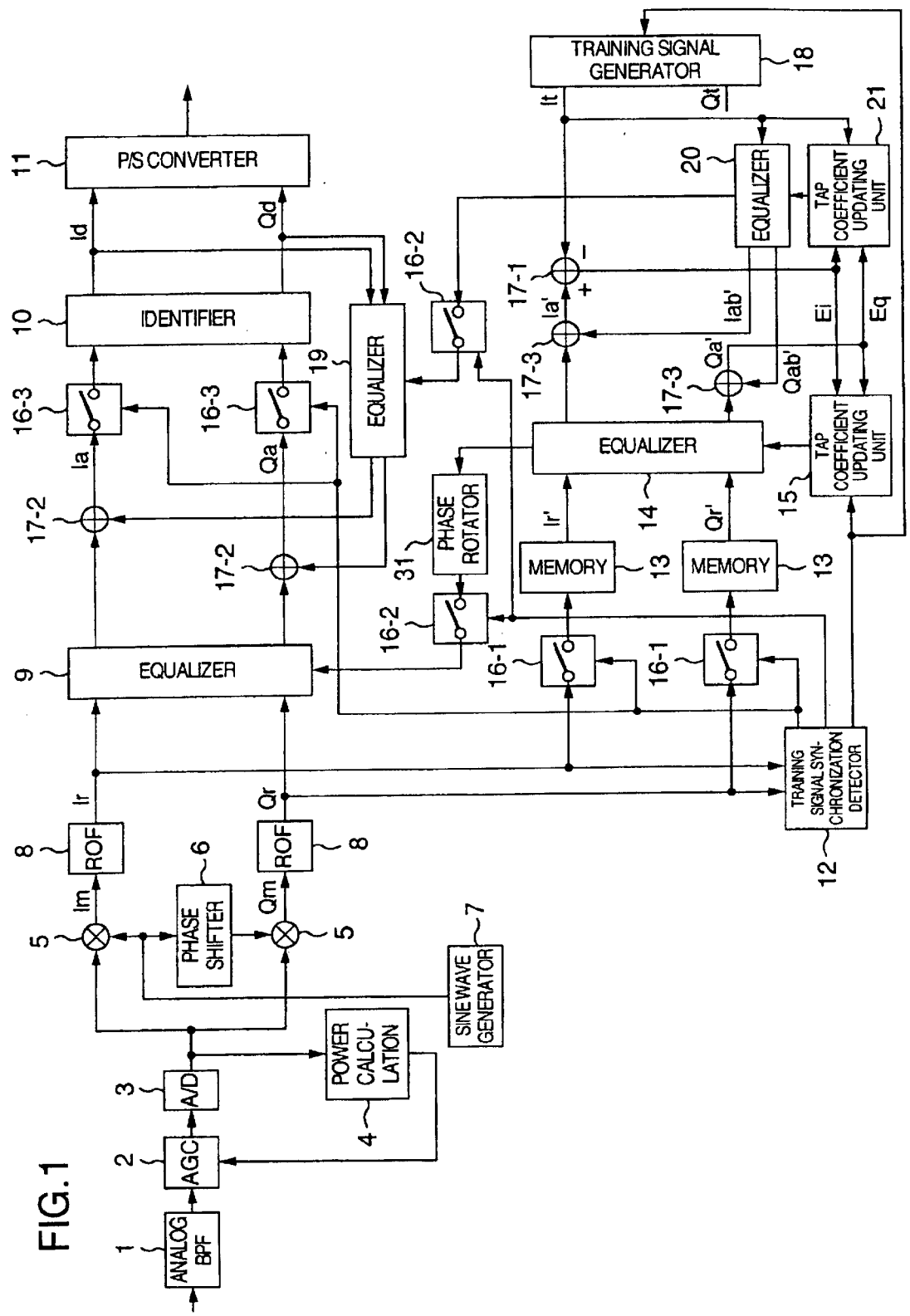
FIG. 1 is a block diagram showing the structure of a reception circuit including an automatic equalization circuit according to an embodiment of the invention.

Embodiments of the invention will be described with reference to the accompanying drawings. In the drawings, like elements are represented by identical reference numerals and the duplicated description thereof is omitted.

Figure 12:
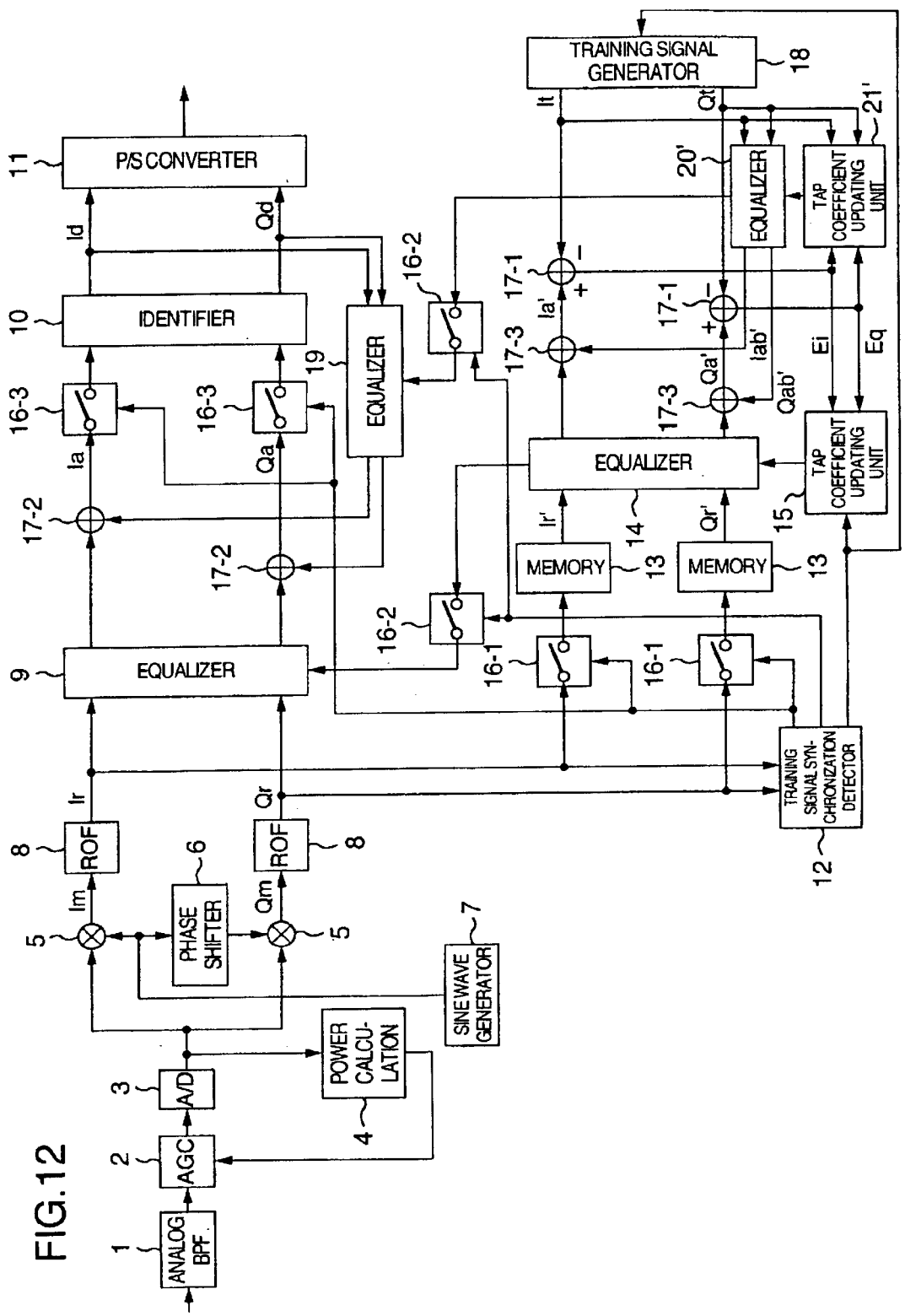
FIG. 12 is a block diagram showing the structure of a demodulation circuit (reception circuit) including a decision feedback type automatic equalization circuit.

With reference to FIG. 12, a demodulation circuit (receiver circuit) embodying the invention will be described, which circuit includes an automatic equalization circuit including decision feedback equalizers. The decision feedback equalizer shown in FIG. 12 has been proposed by the inventors of the present invention and is not prior art. Obviously, the invention is not limited only thereto, but is also applicable to other types of automatic equalization circuits.

In FIG. 12, blocks 9, 12, 13, 14, 15, 16-1, 16-2, 16-3, 17-1, 17-2, 17-3, 18, 19, 20' and 21' constitute the automatic equalization circuit.

An analog BPF 1, an AGC circuit 2, an A/D converter 3, a reception power calculating unit 4, multipliers 5, a phase shifter 6, a sine wave oscillator 7, and roll-off filters 8 constitute a reception processing section.

Figure 11:
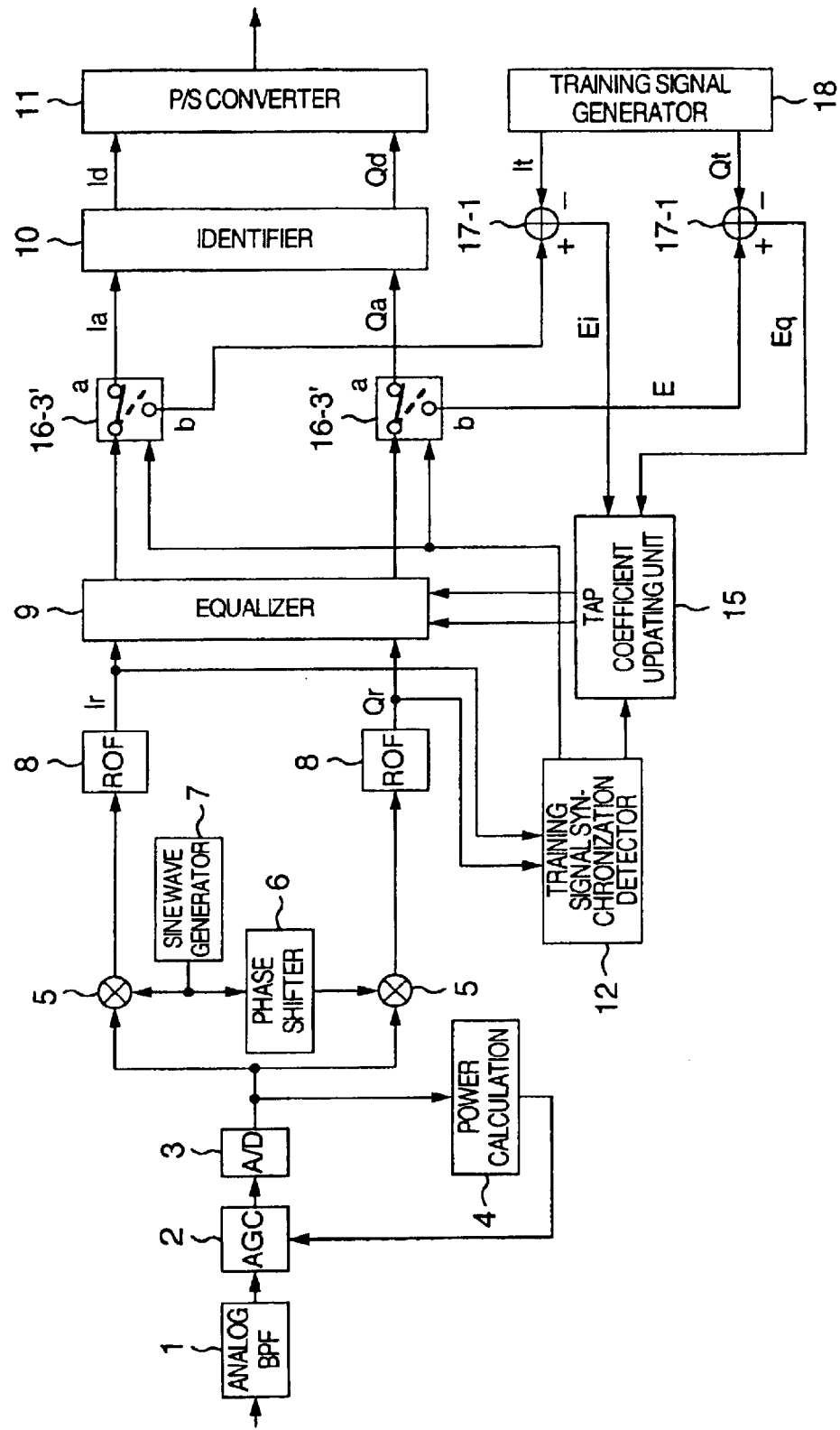
FIG. 11 is a block diagram showing an example of the structure of a conventional demodulation circuit.

The structure of the analog BPF 1, AGC circuit 2, A/D converter 3, reception power calculating unit 4, multipliers 5, phase shifter 6, sine wave oscillator 7, roll-off filters 8, an identifier 10 and a P/S converter 11 is similar to that of the reception circuit shown in FIG. 11.

Equalizers 14, 19 and 20', tap coefficient updating units 15, 21', adders 17-1, 17-2 and 17-3 and a training signal generator 18 constitute a tap coefficient updating section.

In FIG. 12, different points of the structure from that shown in FIG. 11 are mainly the addition of the blocks including the memories 13, feedforward type equalizer 14, feedback type equalizers 19 and 20', tap coefficient updating calculator 21' switches 16-1 and 16-2 and adder 17-3, and the use of one contact switch 16-3 in place of the two-contact switch 16-3'.

In the newly added blocks, signals Id and Qd outputted from the identifier 10 are inputted to the feedback type equalizer 19. The waveforms of the input signals are equalized in a manner similar to the case of the equalizer 20', and the waveform equalized signals are inputted to the adders 17-2. The signals outputted from the equalizer 9 are also inputted to the adders 17-2. The I components are added together, and the Q components are added together. The added signals Ia and Qa are inputted to the identifier 10 via the switches 16-3. Signals Ir and Qr outputted from the roll-off filters 8 are inputted to the memories 13 via the switches 16-1. The signals in the memories 13 are inputted as signals Ir' and Qr' to the feedforward type equalizer 14. Training signals It and Qt generated by the training signal generator 18 are inputted to the adders 17-1, feedback type equalizer 20' and tap coefficient updating unit 21'. The waveforms of the signals inputted to the feedback type equalizer 20' are equalized in a manner similar to the case of the equalizer 191. The waveform equalized signals are inputted to the adders 17-3. The adders 17-3 have the addition function similar to that of the adders 17-2 and add together output signals from the equalizers 14 and 20' to obtain signals Ia' and Qa'. These signals Ia' and Qa' are inputted to the adders 17-1 to be added to the signals It and Qt to obtain equalization errors Ei and Eq. The equalization errors Ei and Eq are inputted to the tap coefficient updating units 15 and 21'. The tap coefficients generated by the unit 15 are inputted to the equalizer 14 which is made to enter an equalization condition. The tap coefficients of the equalizer 9 in the equalization condition are outputted to the equalizer 9 via the switch 16-2. By using these tap coefficients, the equalizer 9 enters the equalization condition. The tap coefficient updating unit 21' generates the tap coefficients in accordance with the input equalization errors Ei and Eq and training signals It and Qt. These generated tap coefficients are inputted to the equalizer 20' to make it enter the equalization condition. The tap coefficients of the equalizer 20' in the equalization condition are outputted to the equalizer 19 via the switch 16-2., By using these tap coefficients, the equalizer 19 enters the equalization condition. The switches 16-1, 16-2 and 16-3, tap coefficient updating unit 15 and training signal generator 18 are operated in response to the timing of the training signal detected with the training signal synchronization detector 12.

A so-called decision feedback automatic equalizer utilizing the feedforward type equalizer and the feedback type equalizer is detailed, for example, in Shahid U. H. Qureshi "Adaptive Equalization", Proceedings of the IEEE, Vol. 73, No. 9, September 1985, pp. 1365–1372, and Hideichi Sasaoka "Mobile Communication", published by Ohm Publishing company, May 25, 1998, pp. 257–263.

Figure 5:
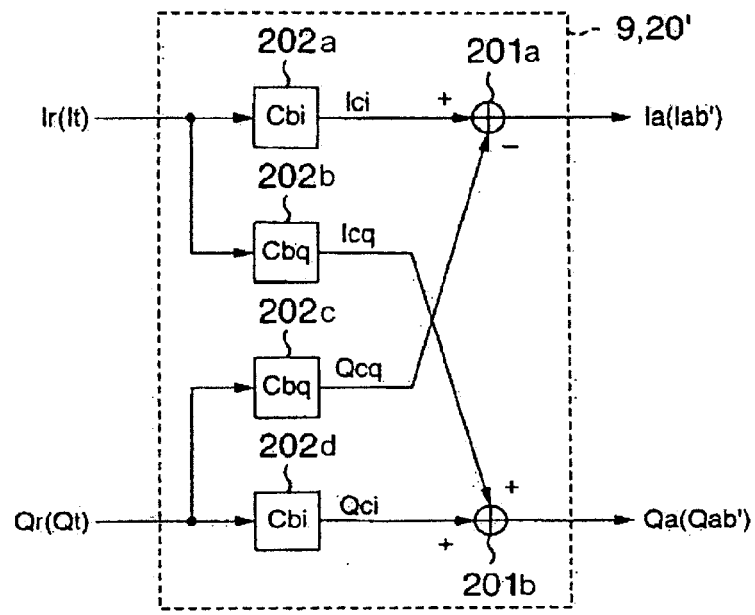
FIG. 5 is a block diagram showing an example of the structure of an equalizer of the reception circuit shown in FIG. 12, the tap coefficients of the equalizer being updatable.

Similarly to the equalizers described with FIG. 5, the feedforward type and feedback type equalizers calculate complex numbers. The equalizer 20' shown in FIG. 5 uses two adders 201a–b and four transversal filters 202a–d. Of the input and output signals shown in FIG. 5, Ir, Qr, Ia and Qa are used for the equalizer 9, and It, Qt, Iab' and Qab' are used for the equalizer 20'.

Figure 6:
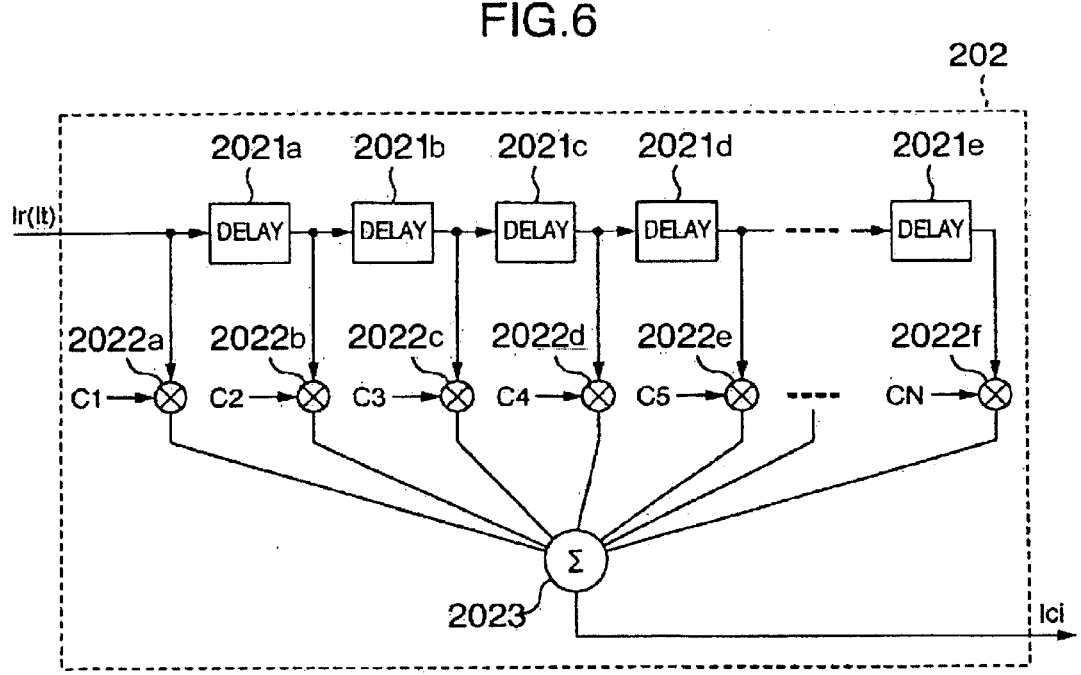
FIG. 6 is a block diagram showing an example of the structure of a transversal filter.

Each transversal filter 202a–d of the feedforward type and feedback type equalizers is generally constituted by (N-1) delay elements 2021a–e, N multipliers 2022a–f and a summing unit 2023 as shown in FIG. 6: The equalization characteristics of the equalizer 9 can be changed by updating tap coefficients C1 to CN to be set to the multipliers 2022.

Figure 4:
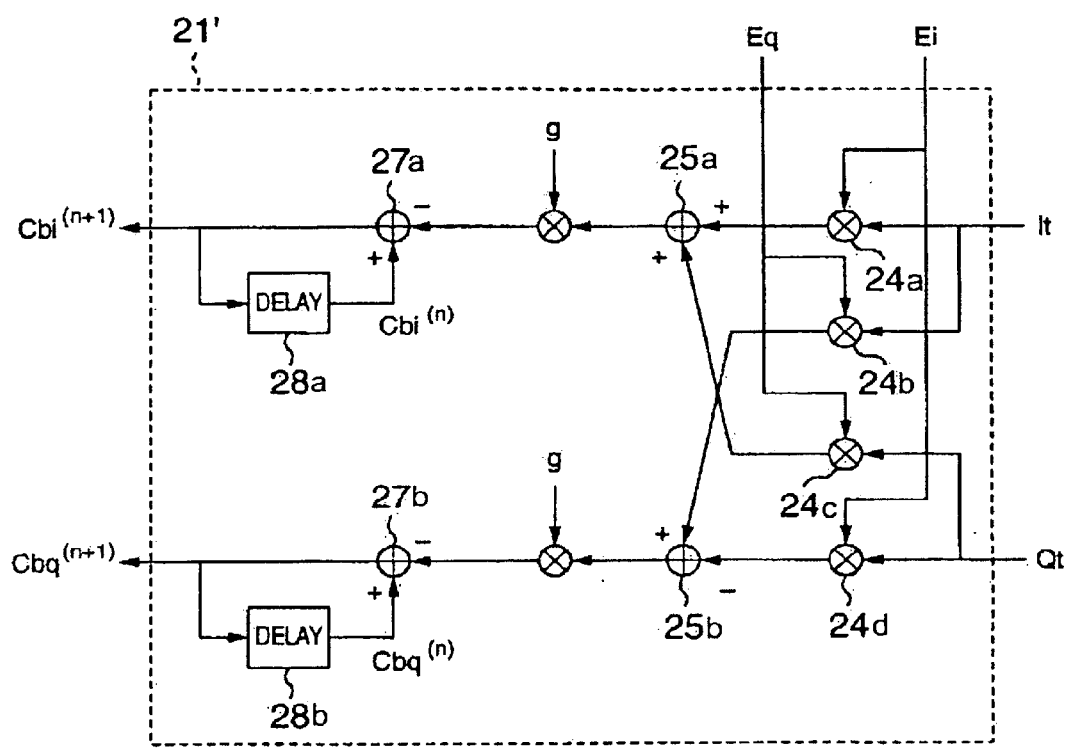
FIG. 4 is a block diagram showing an example of the structure of a tap coefficient updating unit used by an automatic equalization circuit of a reception circuit shown in FIG. 12.

As shown in FIG. 4, the tap coefficient updating unit 21' for updating tap coefficients of the feedback type equalizer 20' so as to realize equalization convergence calculates complex numbers by using the input equalization errors Ei and Eq and training signals It and Qt. In FIG. 4, reference numerals 24a–d and 26a–b represent multipliers, reference numerals 25a–b and 27a–b represent adders and reference numerals 28a–b represent delay circuits.

The relation between input and output signals of the equalizers shown in FIG. 5 will be described by taking as an example the equalizer 20'. The tap coefficient vectors of each transversal filter 202a–d are represented by Cbi and Cbq. These tap coefficient vectors are constituted of the tap coefficients C1 to CN. The input signal vectors obtained by setting the input signals It and Qt in a time domain for respective delay times of the delay elements 2021a–e are represented by It and Qt. The relation between an input signal complex number vector (It+ j·Qt) and the tap coefficient vectors Cbi and Cbq is given by:

$$(It+j\cdot Qt)\cdot (Cbi+j\cdot Cbq)=(It\cdot Cbi-Qt\cdot Cbq)+j\cdot (It\cdot Cbq+Qt\cdot Cbi)$$

The values of output signals Iab' and Qab' can therefore be given by the following equations by using the input signal vectors It and Qt and tap coefficient vectors Cbi and Cbq:

$$Iab'=It\cdot Cbi-Qt\cdot Cbq$$

$$Qab'=It\cdot Cbq+Qt\cdot Cbi$$

By changing the tap coefficient vectors Cbi and Cbq, the transmission characteristics, i.e., characteristics between the input signals It and Qt and output signals Iab' and Qab' can be changed.

The tap coefficient vectors of each transversal filter 202a–d shown in FIG. 5 of the feedback type equalizer are Cbi and Cbq, whereas those of the feedforward type equalizer are Cfi and Cfq.

How the equalization characteristics are set will be detailed.

A signal called a training signal having a predetermined format is preset as a standard or reference signal. Prior to a transmission start of data signals, this training signal is transmitted from a transmitter (modulator) (not shown) to the receiver (demodulator). By using the training signal, the equalization characteristics are set and thereafter, the data signal is transmitted.

On the reception apparatus side, the received training signal is compared with a training signal generated by the training signal generator 14, and in accordance with differences therebetween, the tap coefficients of the equalizer 9 are sequentially changed to set the final tap coefficients when the equalization convergence is achieved, to the equalizer 9.

The tap coefficient updating operation for setting the equalization characteristics is performed through calculations using a predetermined equalization algorithm. The calculation method for the tap coefficient updating operation will be described which uses, for example, an equalization algorithm using a least mean square method.

For the feedforward type equalizer with the tap coefficient vectors of Cfi and Cfq, the calculation is performed by:

$$Cf^{(n+1)}=Cf^{(n)}-g\cdot X^*\cdot E$$

where $Cf^{(n+1)}$: tap coefficients at time (n+1)

$Cf^{(n)}$: tap coefficients at time n $X^*$: complex conjugate number of input signal $X^*=Ir-j\cdot Qr$ (where $j=\sqrt{(-1)}$)

E: equalization error $E=Ei+j\cdot Eq$ g: tap update gain

For the feedback type equalizer with the tap coefficient vectors of Cbi and Cbq, the calculation is performed by:

$$Cb^{(n+1)}=Cb^{(n)}-g\cdot R^*\cdot E$$

where $Cb^{(n+1)}$: tap coefficients at time (n+1)

$Cb^{(n+1)}=Cbi^{(n+1)}+j\cdot Cbq^{(n+1)}$ $Cb^{(n)}$: tap coefficients at time n $C^{(n)}=Cbi^n+j\cdot Cbq^{(n)}$ $R^*$: complex conjugate number of reference training signal $R^*=It-j\cdot Qt$ E: equalization error $E=Ei+j\cdot Eq$ g: tap update gain This equation to be used for obtaining the tap coefficient vectors of the feedback type equalizer is realized by the tap coefficient updating unit 21' shown in FIG. 4.

The automatic equalization circuit shown in FIG. 12 can shorten the time taken to recover the equalization condition after the divergence of the equalizer, as compared to the demodulation circuit shown in FIG. 11. However, similar to the circuit shown in FIG. 11, the calculation amount becomes very large because the above-described equations are calculated for each tap and the input signal is represented by a complex number and has both the in-phase and quadrature amplitude components. If the tap updating is performed by using software, the process time becomes very long and the program itself becomes large, whereas if the tap updating is performed by using hardware, the circuit scale becomes very large.

FIG. 1 is a block diagram showing the structure of a demodulation circuit (reception circuit) including an automatic equalization circuit, according to an embodiment of the invention, capable of shortening the process time and reducing the size of programs if tap coefficient updating is performed by using software, and reducing the circuit scale if it is performed by using hardware, while the equalization convergence performance same as that of the circuit shown in FIG. 11 is retained.

Referring to FIG. 1, the bandwidth of a received signal is limited by an analog BPF 1 and thereafter at an AGC circuit 2, the level of the received signal is changed to a predetermined level irrespective of its signal level when received. This signal is then inputted to an A/D converter 3 to be converted into a digital signal and supplied to a reception power calculator 4 to calculate the reception power which is fed back to control the gain of the AGC circuit 2. The output signal of the A/D converter 3 is supplied to multipliers 5 whereat the output signal is multiplied by a sinusoidal wave $\cos(\omega c\cdot t)$ having a modulation wave frequency fc generated by a sine wave generator 7 and the output signal is also multiplied by a sine wave $\sin(\omega c\cdot t)$ obtained by shifting the cosine wave $(\omega c\cdot t)$ by $\pi/2$ at a phase shifter 6, where $\omega c=2\cdot\pi\cdot fc$. The multiplication results, in-phase component (I) and quadrature component (O), are passed through roll-off filters 8 to shape the waveforms of these signals to thereafter input them to an equalizer 9.

Referring to FIG. 1, a training signal synchronization detector 12 detects the training signal to be used for synchronization from signals Ir and Qr obtained by shaping at the roll-off filters 8 the waveforms of the output signals of the multipliers 5, i.e., demodulated signals Im and Qm. While the training signal is received, switches 16-1 are turned on to store the output signals Ir and Or of the roll-off filters 8 in memories 13. A difference between an output signal Ia' and a signal It generated by a training signal generator 18 is used as an error signal Ei. The output signal Ia' is a sum of the output signals of a feedforward type equalizer 14 and a feedback type equalizer 20 having the same structures as those of the feedforward type equalizer 9 and a feedback type equalizer 19, respectively. A sum Qa' of the output signals of the equalizers 14 and 20 is used directly as an error signal Eq. Therefore:

$$Ei=Ia'-It$$

$$Eq=Qa'$$

By using these error signals, tap coefficients of the equalizer 14 are updated. The feedforward type equalizers 9 and 14 and the feedback type equalizers 19 and 20 are of a complex number structure such as shown in FIG. 5. For the feedback type equalizer, the following equations are satisfied:

$$(It+j\cdot Qt)\cdot(Cbi+j\cdot Cbq)=(It\cdot Cbi-Qt\cdot Cbq)+j\cdot(It\cdot Cbq+Qt\cdot Cbi), \text{ therefore}$$

$$Iab'=It\cdot Cbi-Qt\cdot Cbq$$

$$Qab'=It\cdot Cbq+Qt\cdot Cbi$$

The transversal filter 202$a$–$d$ has a general structure such as shown in FIG. 6.

The tap coefficients of the equalizers 14 and 20 are updated by tap coefficient updating units 15 and 21 to gradually achieve the equalization condition. For example, if the least mean square method is adopted for the tap coefficient updating algorithm, the following calculations are performed for each tap.

For the feedforward type equalizer, the calculation is performed by:

$$Cf^{(n+1)}=Cf^{(n)}-g\cdot X^*\cdot E$$

where $Cf^{(n+1)}$: tap coefficients at time (n+1)

$Cf^{(n)}$: tap coefficients at time n $X^*$: complex conjugate number of input signal $X^*=Ir-j\cdot Qr$ (where $j=\sqrt{(-1)}$)

E: equalization error $E=Ei+j\cdot Eq$ g: tap update gain

For the feedback type equalizer, the calculation is performed by:

$$Cb^{(n+1)}=Cb^{(n)}-g\cdot R^*\cdot E$$

where $Cb^{(n+1)}$: tap coefficients at time (n+1)

$Cb^{(n+1)}=Cbi^{(n+1)}+j\cdot Cbq^{(n+1)}$ $Cb^{(n)}$: tap coefficients at time n $Cb^{(n)}=Cbi^{(n)}+j\cdot Cbq$ R*: complex conjugate number of reference training signal $R^*=It-j\cdot Qt$ E: equalization error $E=Ei+j\cdot Eq$ g: tap update gain By using the above equations, the tap coefficient updating is repeated to achieve the equalization condition. When the equalization errors become nearly zero, the equalization condition is established.

When the next training signal is received, the calculated tap coefficients are written as the tap coefficients of the equalizer 9. At the time when the training signal is terminated and the data signal starts, switches 16-3 are tuned on, thus the outputted signals Ia and Qa which are respectively sums of the output signals of the feedforward type equalizer 9 and feedback type equalizer 19 are inputted to an identifier 10 which identifies equalized signals and the identification results are inputted to a parallel/serial converter 11 from the identifier 10, so that the serial demodulated reception data is outputted from the P/S converter 11.

Figure 8:
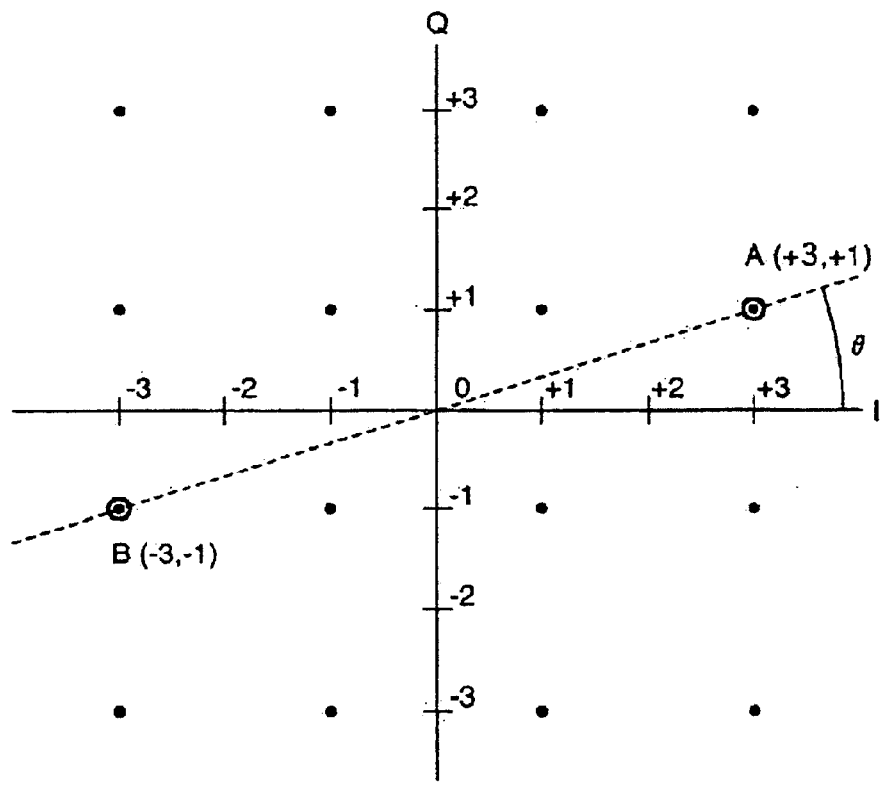
FIG. 8 shows a constellation plane for a 16 QAM system.
Figure 9:
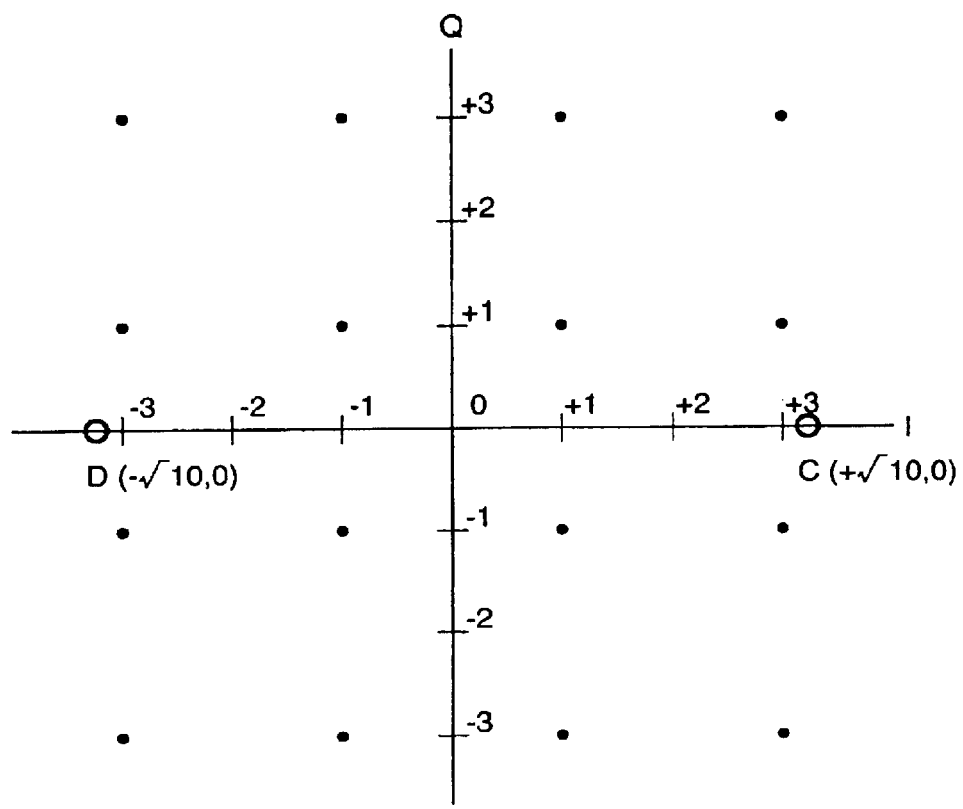
FIG. 9 shows another constellation plane for a 16 QAM system.

When the signal paints of the received training signal are A and B such as shown in FIG. 8, the signal paints outputted from the training signal generator 18 are relatively rotated to the positions C and D shown in FIG. 9, so that the quadrature component signal Qt of the training signal generator 18 shown in FIG. 1 for example, is not outputted. In this case, the in-phase component is 110 and the quadrature component is 0. Namely, the signal It is ±√10 and the signal Qt is 0.

Figure 2:
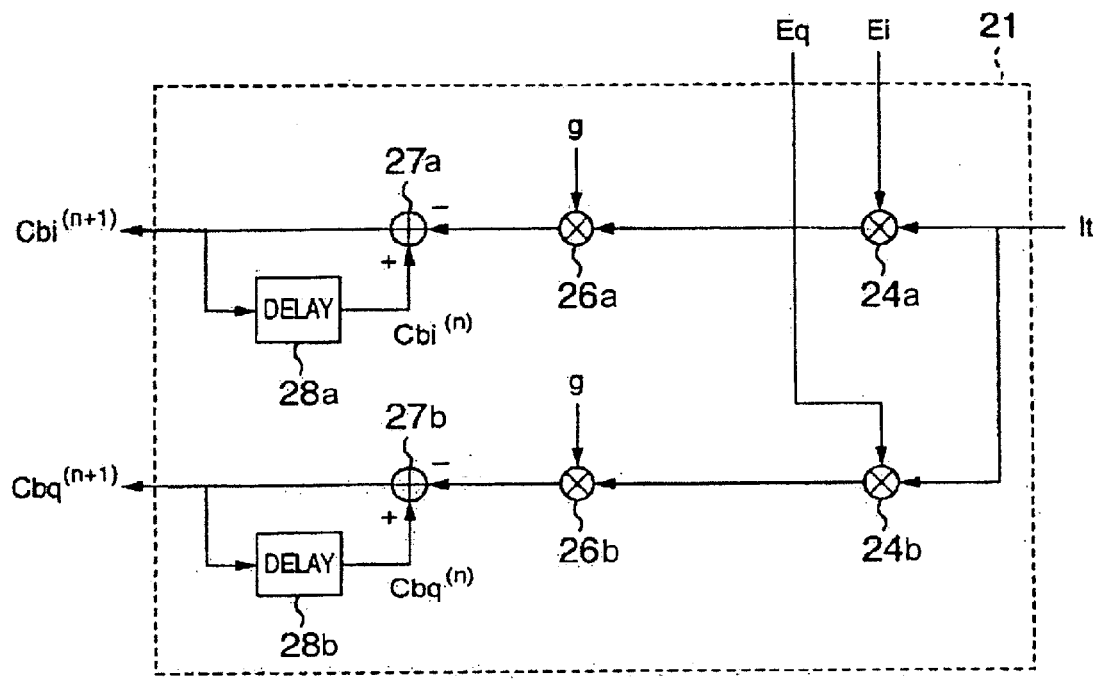
FIG. 2 is a block diagram of a tap coefficient updating unit of the invention.
Figure 3:
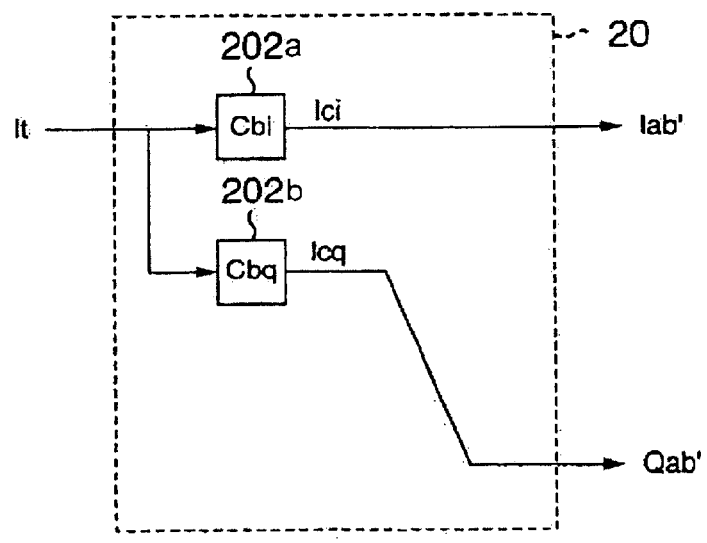
FIG. 3 is a block diagram of an equalizer of the invention.

The signal Qt inputted to the feedback type equalizer 20' of the complex number structure shown in FIG. 5 is 0. Therefore, an equalizer 20 of a simplified circuit structure having two transversal filters 202 shown in FIG. 3 can be used in the embodiment. Also, the signal Qt inputted to the tap coefficient updating unit 21' shown in FIG. 4 is 0. Therefore, a tap coefficient updating unit 21 of a simplified circuit structure shown in FIG. 2 can be used in the embodiment. The circuit structures of the equalizer 20 and tap updating unit 21 are much simpler than those of the equalizer 20' and tap coefficient updating unit 21' and the calculation amount is approximately halved.

In the automatic equalization circuit shown in FIG. 1, when the received training signal has the signal points A and B, the training signal (reference training signal) generated by the training signal generator 18 has the signal points C and D having a phase difference of θ therebetween. Therefore, the tap coefficients in the equalization condition are required to be rotated by θ. Prior to setting the tap coefficients from the feedforward type equalizer 14 to the feedforward type equalizer 9, the tap coefficients are rotated by θ so that the tap coefficients for the signal points A and B of the reference training signal can be obtained and the feedforward type equalizer 9 and feedback type equalizer 19 can be set correctly to the equalization condition.

In order to rotate the phase by θ, the following calculations are performed:

$$Cf^{(n+1)'}=Cf^{(n+1)}\times e^{j\cdot\theta}$$

where $$Cf^{(n+1)'}=Cfi^{(n+1)'}+j\cdot Cfq^{(n+1)'}$$

$$Cf^{(n+1)}=Cfi^{(n+1)}+j\cdot Cfq^{(n+1)}$$

$$e^{j\cdot\theta}=\cos\theta+j\cdot\sin\theta$$

Figure 7:
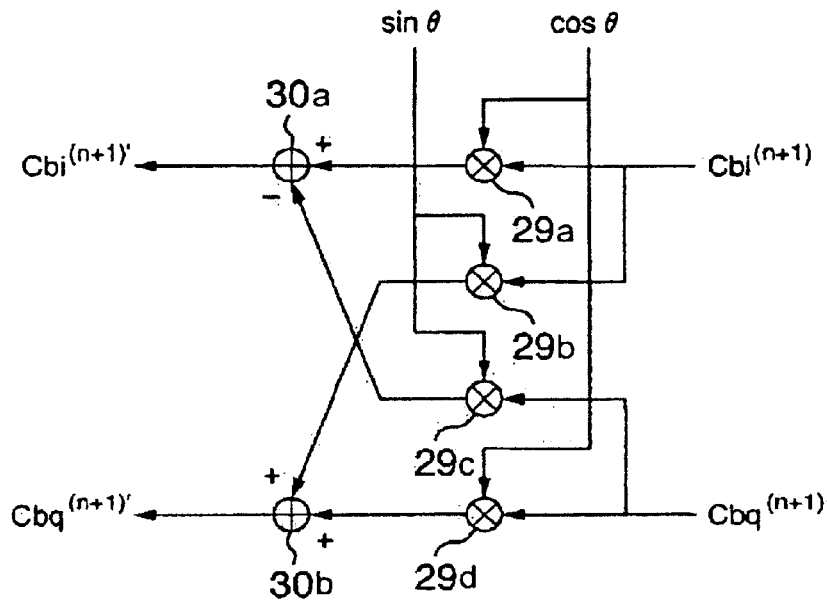
FIG. 7 is a block diagram of a phase rotator of the invention.

$Cf^{(n+1)} \times e^{j \cdot \theta} = (Cfi^{(n+i)} \cdot \cos\theta - Cfq^{n+1} \cdot \sin\theta) + j \cdot (Cfi^{(n+1)}$ $Cfi^{(n+1)'} = Cfi^{(n+1)} \cdot \cos\theta - Cfq^{(n+1)} \cdot \sin\theta$ $Cfi^{(n+1)'} = Cfi^{(n+1)} \cdot \sin\theta + Cfq^{(n+1)} \cdot \cos\theta$ FIG. 7 is a block diagram showing phase rotators 31 for calculating the above-described two equations. In FIG. 7, reference numeral 29 represents a multiplier and reference numeral 30 represents an adder.

Referring back to FIG. 1, the tap coefficients $Cf^{n+1}$ of the equalizer 14 in the equalization convergence condition are rotated by 0 by the phase rotator 31 to obtain $Cf^{(n+1)'}$ which is set to the feedforward type equalizer 9 while the switch 16-2 is turned on.

Figure 13:
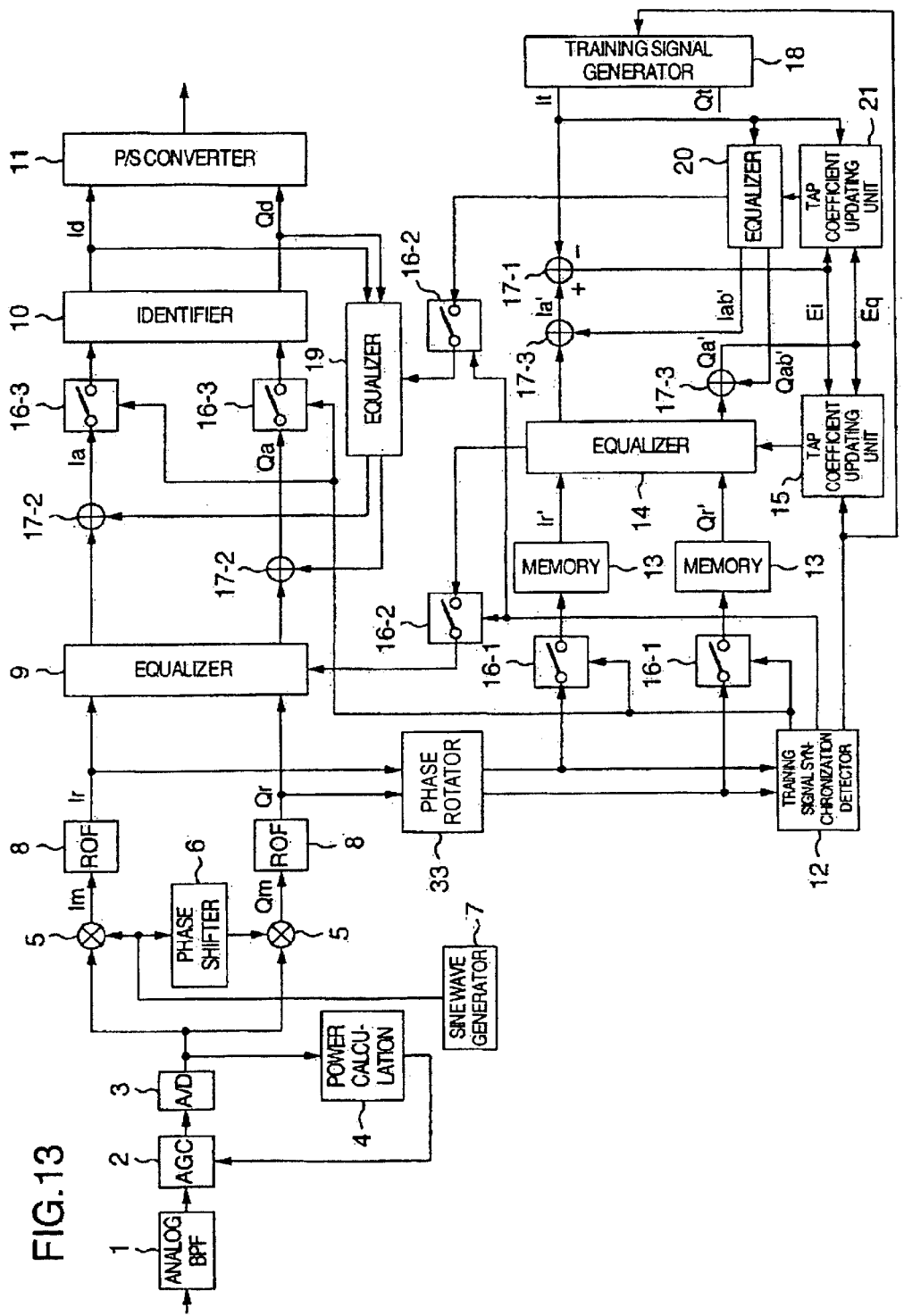
FIG. 13 is a block diagram showing the structure of a demodulation circuit according to another embodiment of the invention.

FIG. 13 is a block diagram showing a receiver circuit including an automatic equalization circuit according to another embodiment of the invention. In FIG. 13, signals to be inputted to the memories 13 and feedforward type equalizer 14 are rotated in phase by $-\theta$ by a phase rotator 33. When the signal points of received training signal are A and B such as shown in FIG. 8, the signal points of the training signal inputted to the feedforward type equalizer 14 are therefore rotated in phase and have the same phase as that of the signal points C and D shown in FIG. 9 to be changed from the phase of the signal points A and B. The training signal generated by the training signal generator 18 has also the same phase of the signal points C and D and the tap coefficients in the equalization convergence condition are not rotated in phase. Therefore, these tap coefficients can be set directly to the feedforward type equalizer 9 and feedback type equalizer 19. The tap coefficient values same as those obtained by the circuit shown in FIG. 1 can be set.

Figure 14:
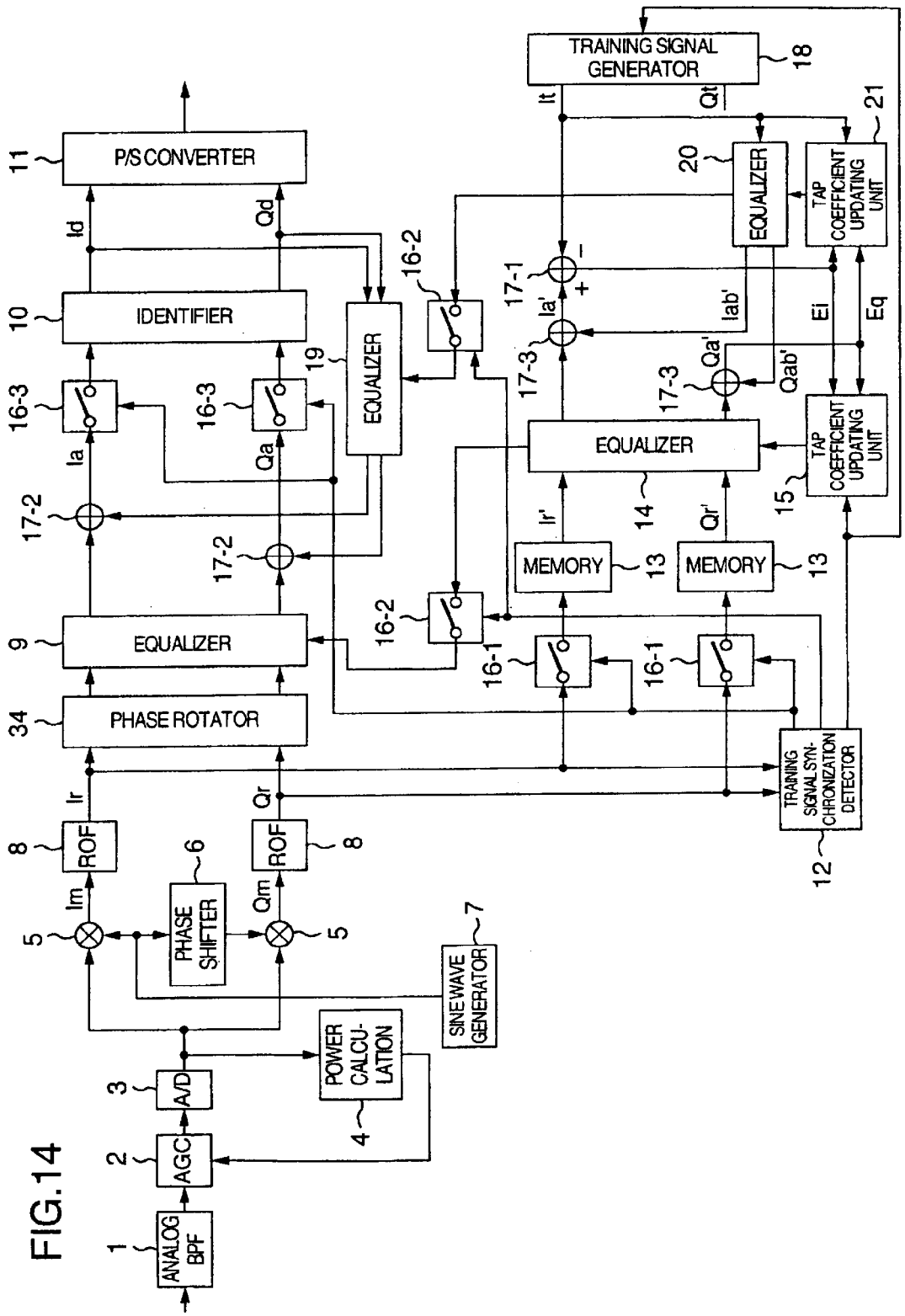
FIG. 14 is a block diagram showing the structure of a demodulation circuit according to another embodiment of the invention.

FIG. 14 is a block diagram showing a receiver circuit including an automatic equalization circuit according to another embodiment of the invention. In FIG. 14, similarly to the circuit shown in FIG. 1, the equalization convergence is performed by the equalizers 14 and 20. The tap coefficients of the equalizers 14 and 20 are directly set to the equalizers 9 and 19 without phase rotation. These tap coefficients have therefore a phase rotation of $-\theta$ for the received signal. To compensate for this, the received signals are rotated in phase by $+\theta$ by a phase rotator 34 so that the identifier 10 receives the signals without having any phase rotation and can correctly reproduce the received signals.

Figure 15:
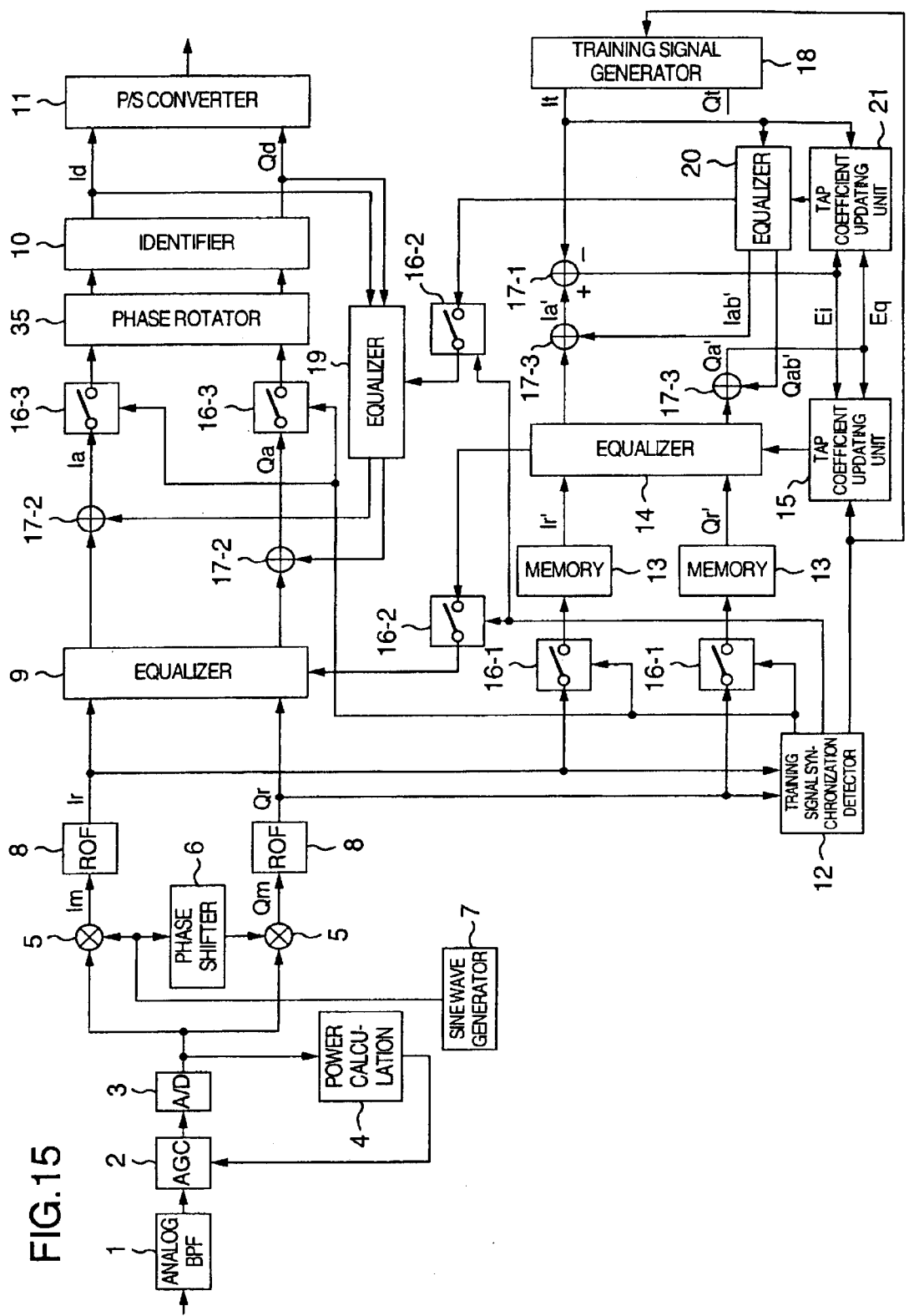
FIG. 15 is a block diagram showing the structure of a demodulation circuit according to another embodiment of the invention.

FIG. 15 is a block diagram showing a receiver circuit including an automatic equalization circuit according to another embodiment of the invention. In FIG. 15, a phase rotator 35 at the input stage of the identifier 10 rotates the phases of the received signals by $+\theta$ so that the similar effects to those described with FIG. 14 can be obtained.

In the structures of the automatic equalization circuit of the reception circuit shown in FIGS. 13 to 15, the signal Qt is 0 same as that shown in FIG. 1. Accordingly, the tap coefficient updating unit and equalizer having the simplified circuit structure shown in FIGS. 2 and 3 can be used and the automatic equalization circuit having a simpler circuit structure can be realized.

Figure 16:
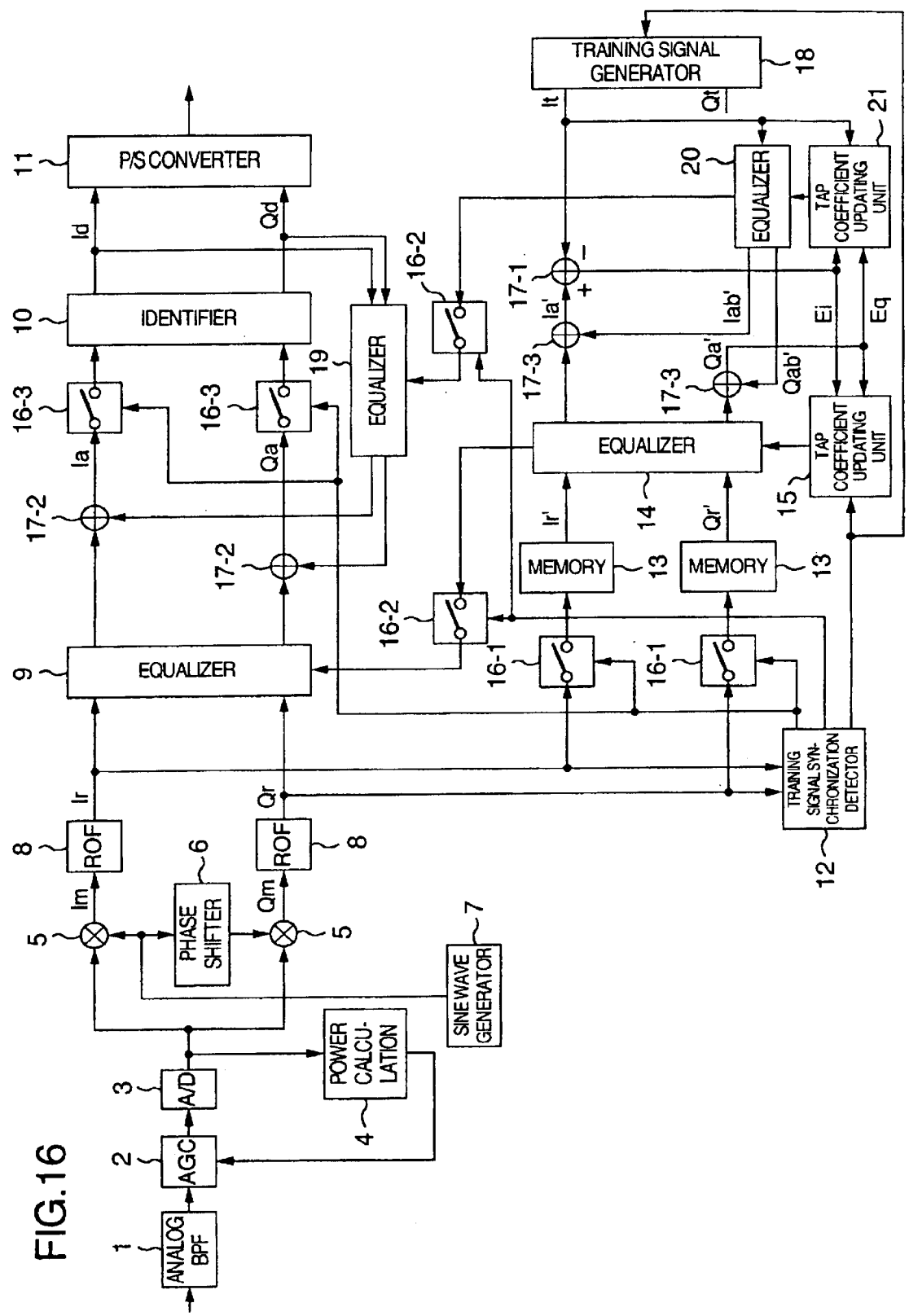
FIG. 16 is a block diagram showing the structure of a demodulation circuit according to another embodiment of the invention.

FIG. 16 is a block diagram showing a receiver circuit including an automatic equalization circuit according to another embodiment of the invention. If the training signal to be transmitted from the modulator (transmitter) has the signal points C and D shown in FIG. 9, the automatic equalization circuit is structured as shown in FIG. 16 so that the phase rotation is not necessary. Accordingly, the tap coefficient updating unit and equalizer having the simplified circuit structure can be used and the automatic equalization circuit having a simpler circuit structure can be realized.

In the above description, although the training signal generated by the training signal generator has the quadrature component of 0 and the in-phase component of not 0, it is obvious that the training signal having the in-phase component of 0 and the quadrature component of not 0 can be used.

Next, another embodiment of the invention will be described with reference to FIG. 17.

Figure 17:
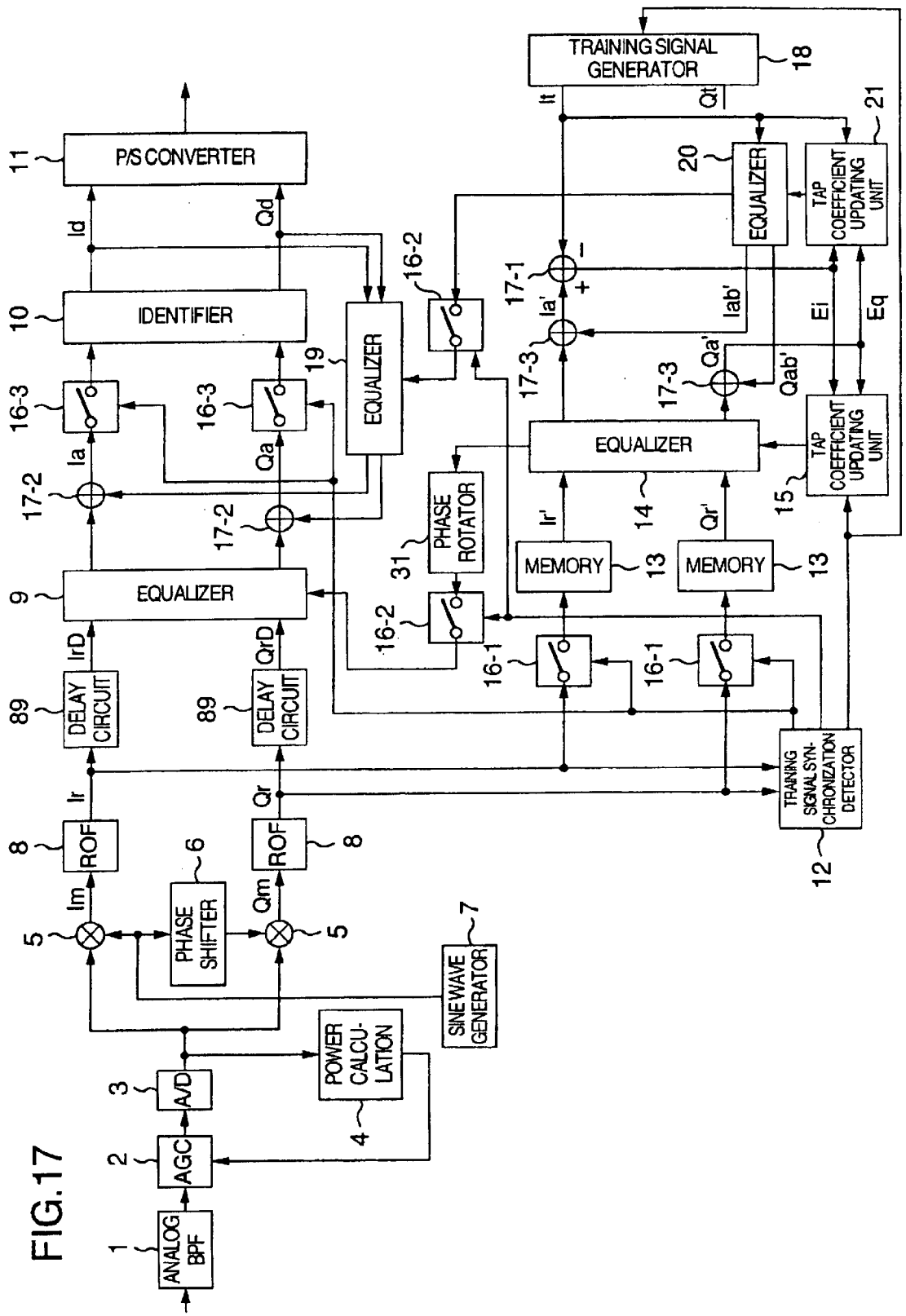
FIG. 17 is a block diagram of a demodulation circuit (reception circuit) according to another embodiment of the invention.

In the embodiment shown in FIG. 17, delay circuits 89 are inserted between roll-off filters 8 and an equalizer 9. The other structures are the same as those shown in FIG. 1.

The delay circuits 89 each have a predetermined delay time $\tau$ to delay signals Ir and Qr outputted from the roll-off filters 8. Delayed output signals IrD and QrD are supplied to the equalizer 9.

Figure 10:
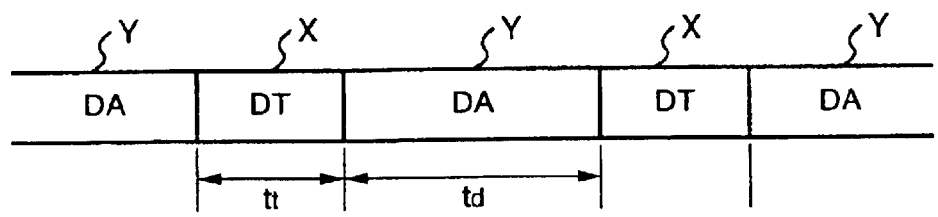
FIG. 10 is a diagram showing training and data signals to be repetitively transmitted.

The predetermined delay time $\tau$ is equal to the time taken to transmit a data signal of one frame, or the transmission time taken to transmit a training signal DT and a data signal DA once, i.e., $\tau = tt + td$ (refer to FIG. 10).

Figure 18:
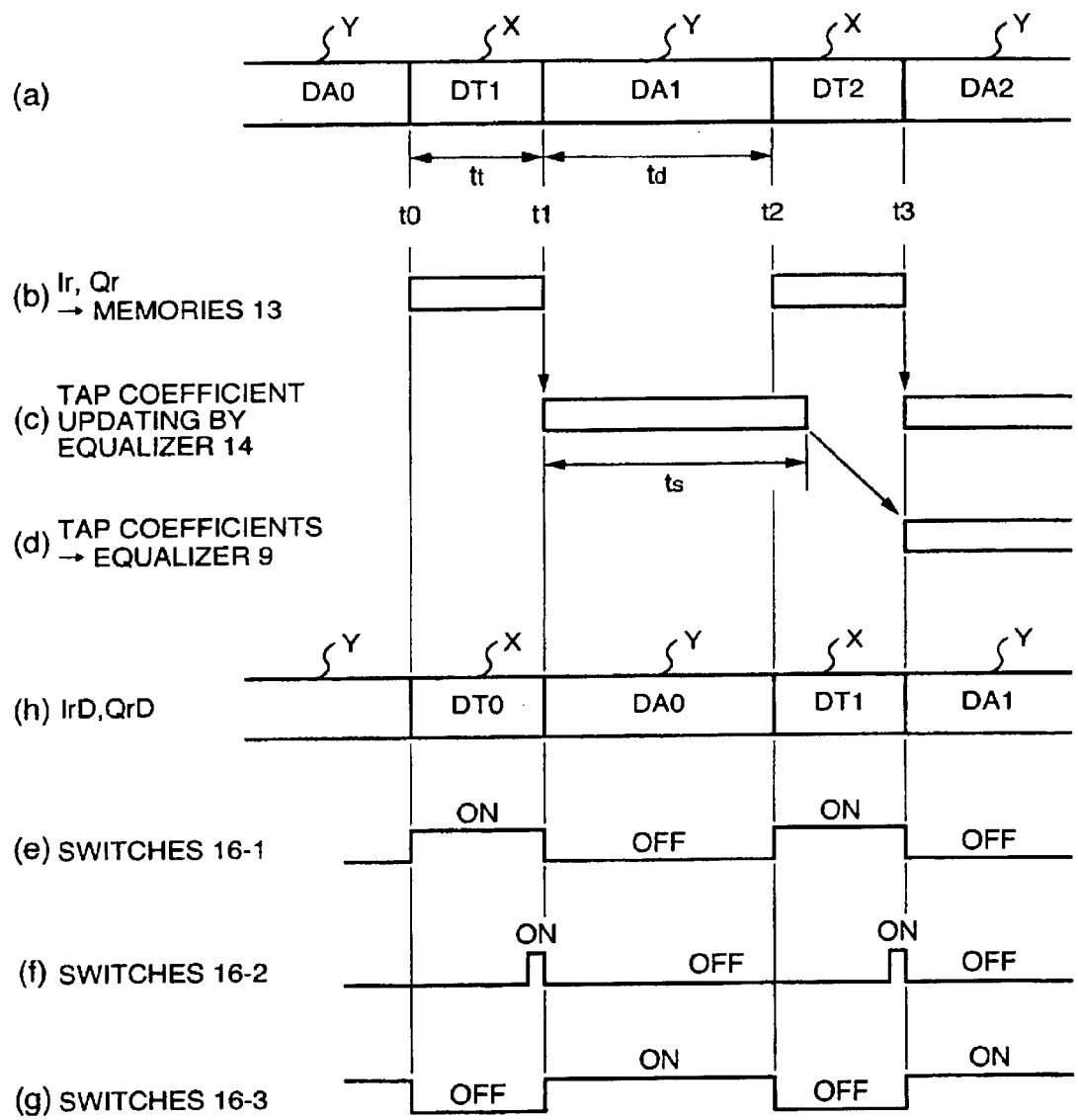
FIG. 18 is a timing chart illustrating the operation of the demodulation circuit shown in FIG. 17.

The operation of this embodiment shown in FIG. 17 will be described with reference to the timing chart of FIG. 18.

For the convenience of description, sequential numbers 0, 1, 2 . . . are affixed to training signals DT and data signals DA shown in FIG. 18(a). Sequential numbers 0, 1, 2, . . . are correspondingly affixed to training signals DT and data signals DA shown in FIG. 18(h). Signals having the same sequential numbers correspond to each other.

It is assumed herein that the training signal outputted from the roll-off filters 8 at time t0 shown in FIG. 18(a) is DT1. This training signal DT1 is stored in the memories 13 as shown in FIG. 18(b). Then, the equalization convergence process by the equalizer 14, i.e., tap coefficient updating process, is executed as shown in FIG. 18(c). The obtained tap coefficients are written via phase rotators 31 and switches 16-2 to the equalizer 9 at time t3 as shown in FIG. 18(d).

The output signals Ir and Qr of the roll-off filters 8 are delayed by one frame by the delay circuits 89 and then input to the equalizer 9. Therefore, the tap coefficients are written in the equalizer 9 under the conditions that the training signal DT1 and succeeding data signal DA1 are synchronized between when the tap coefficients were updated and when the delayed output signals IrD and QrD are supplied to the equalizer 9.

In this case, although it takes one frame time until the tap coefficients are updated, it can be said in terms of equivalence that immediately after the equalization convergence is established by using the training signal DT1, the tap coefficient updating process reflecting the equalization characteristics can be performed for the data signal DA1 of the same frame. Accordingly, in the embodiment shown in FIG. 17, by using the result of the tap coefficient updating process using the training signal DT of each frame, the data signal DA of the same frame can be equalized immediately after the updating process.

In the embodiment shown in FIG. 1, as the equalization convergence operation at some time, e.g., time t0, by using the training signal DT1, is executed, the updated tap coefficients are set to the equalizer 9 for the data signal DA2 of the next frame. The tap coefficients are therefore updated after the lapse of one frame time.

The equalization characteristics set by the converged tap coefficients obtained by using the training signal one frame before can be used without any trouble if the transmission path condition does not change so much. However, if the characteristics of the transmission path changes in a short time, the tap coefficients cannot follow this change and the correct equalization may not be obtained. However, in the embodiment shown in FIG. 17, the change in the transmission path condition can be reflected at once and can be followed up reliably.

In the embodiment shown in FIG. 17, the tap coefficients can be set to the equalizer synchronously with the received signal. The follow-up characteristics can be improved considerably and the received data can be reproduced always correctly even if the transmission path condition changes often.

In the above description, although the delay time τ of the delay circuits 89 is set to the transmission time of one frame, the transmission time may be set as desired. For example, depending upon the relation between the frame length and the tap coefficient updating time, the delay time is required to be set to two or more frames. The delay time of the delay circuits 89 is set to two or more frames in this case.

Figure 19:
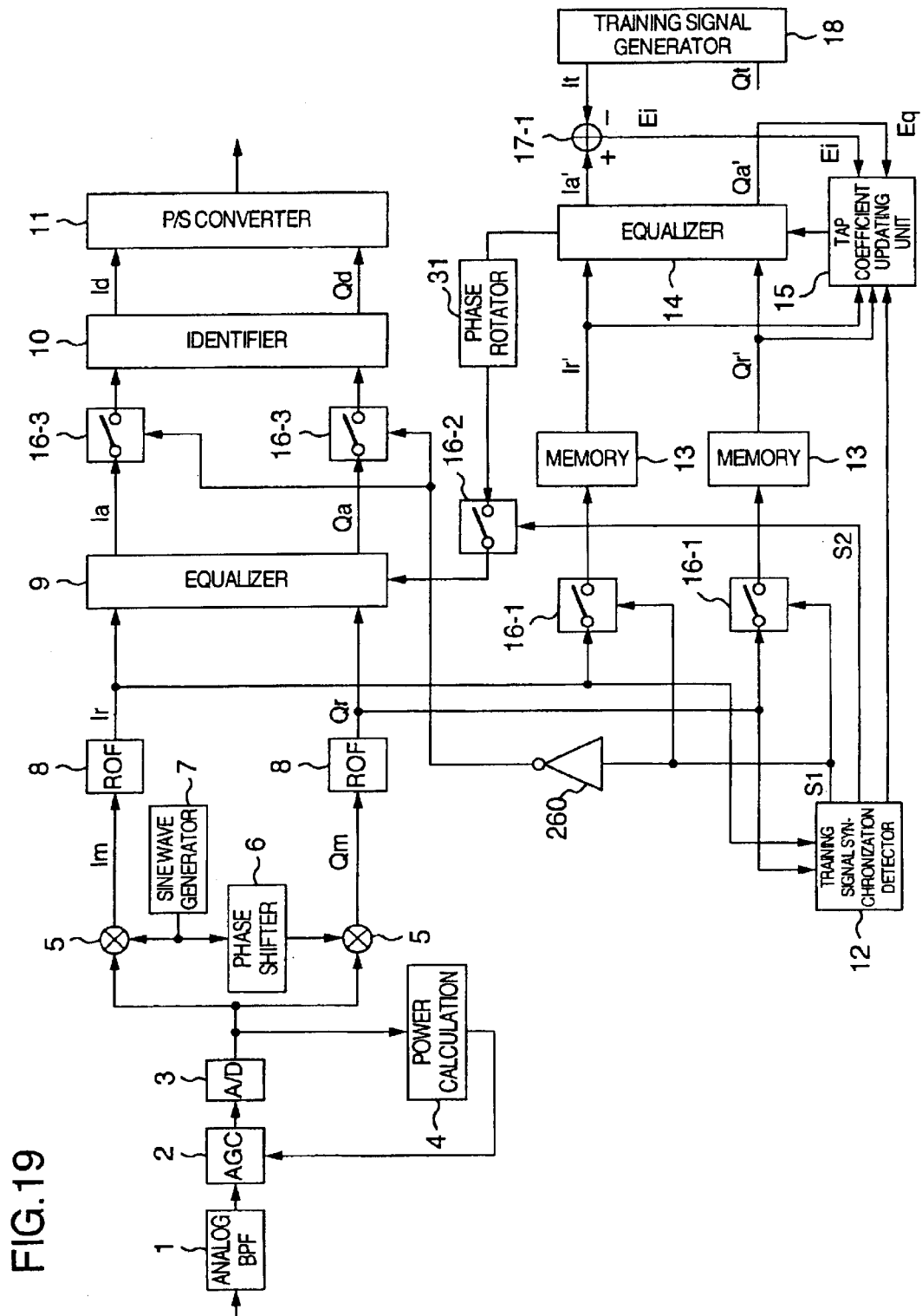
FIG. 19 is a block diagram of a demodulation circuit (reception circuit) according to another embodiment of the invention.

FIG. 19 is a block diagram of a multilevel digital signal reception circuit (modulation circuit) including an automatic equalization circuit according to another embodiment of the invention.

Referring to FIG. 19, signals Ir' and Qr' read from memories 13 are inputted to a tap coefficient updating unit 15. An error signal Ei' obtained by inputting the output signal Ia' of an equalizer 14 and an output signal It of a training signal generator 18 to an adder 17-1, and another output signal Qa' of the equalizer 14, are supplied to the tap coefficient updating unit 15. Namely, Ia'−It=Ei and Qa'=Eq.

Figure 21:
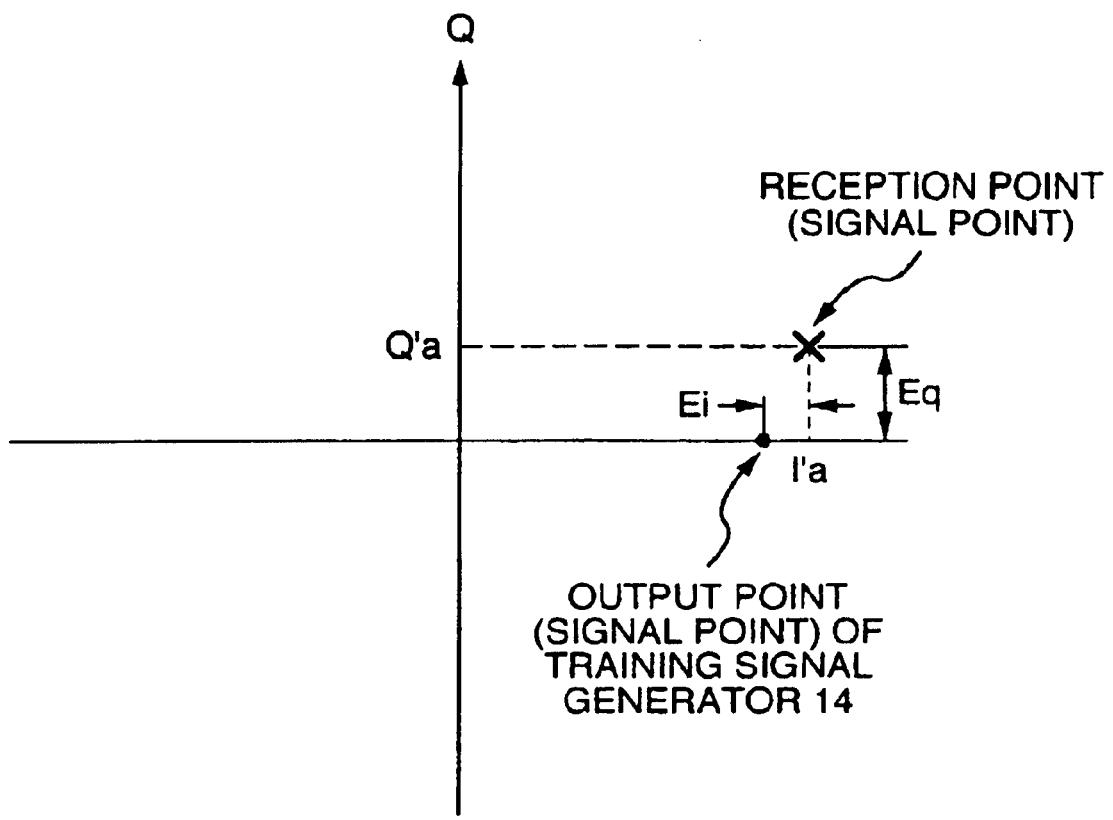
FIG. 21 is an I-Q constellation plane illustrating the operation of the demodulation circuit shown in FIG. 19.

FIG. 21 is an I-Q constellation plane illustrating the above-described relation. In FIG. 21, the output point (signal point) of the training signal generator 18 indicated by a solid black circle is on the I-axis so that the quadrature component Qt is 0. Assuming that the reception point (signal point) is at the position indicated by a cross symbol, Qt in the equation Qa'−Qt=Eq is 0 so that Qa'=Eq. A difference (Ia'−It) between the in-phase component Ia' on the I-axis and the training signal point It is Ei.

In operation, the training signal read from the memories 13 is inputted to the equalizer 14 at a predetermined timing and the tap coefficient updating unit 15 is activated to thereby update the tap coefficients of the equalizer 14 until a predetermined equalization condition is established with this training process by the equalizer 14, the tap coefficients are updated and the predetermined equalization condition can be obtained. Thereafter, the updated tap coefficients are supplied to the equalizer 9 to make it enter the equalization condition.

For such an operation, switches 16-3 and a switch 16-2 are provided. While the training signal is received, output signals Ia and Qa of an equalizer 9 are disconnected from an identifier 10, by using the switches 16-3. By using the switch 16-2, the tap coefficients set to the equalizer 14 are supplied to the equalizer 9 at a predetermined timing.

Switches 16-1 are controlled by a training signal synchronization detector 12 to be closed only during the period while the training signal is detected. Since an inverter 260 is provided, the switches 16-3 are controlled to be opened only during this period, contrary to the switches 16-1.

With the structure described above, the error signal Eq can be calculated easily because the error signal Eq is Qa' itself which is one of the outputs of the equalizer 14. In this case, the tap coefficient updating unit 15 may use the circuit structured as shown in FIG. 4, by using the inputs Ir' and Qr' instead of It and Qt. The structure of the equalizer 14 for equalization training is the same as that of the equalizer 9 for data reproduction.

Figure 20:
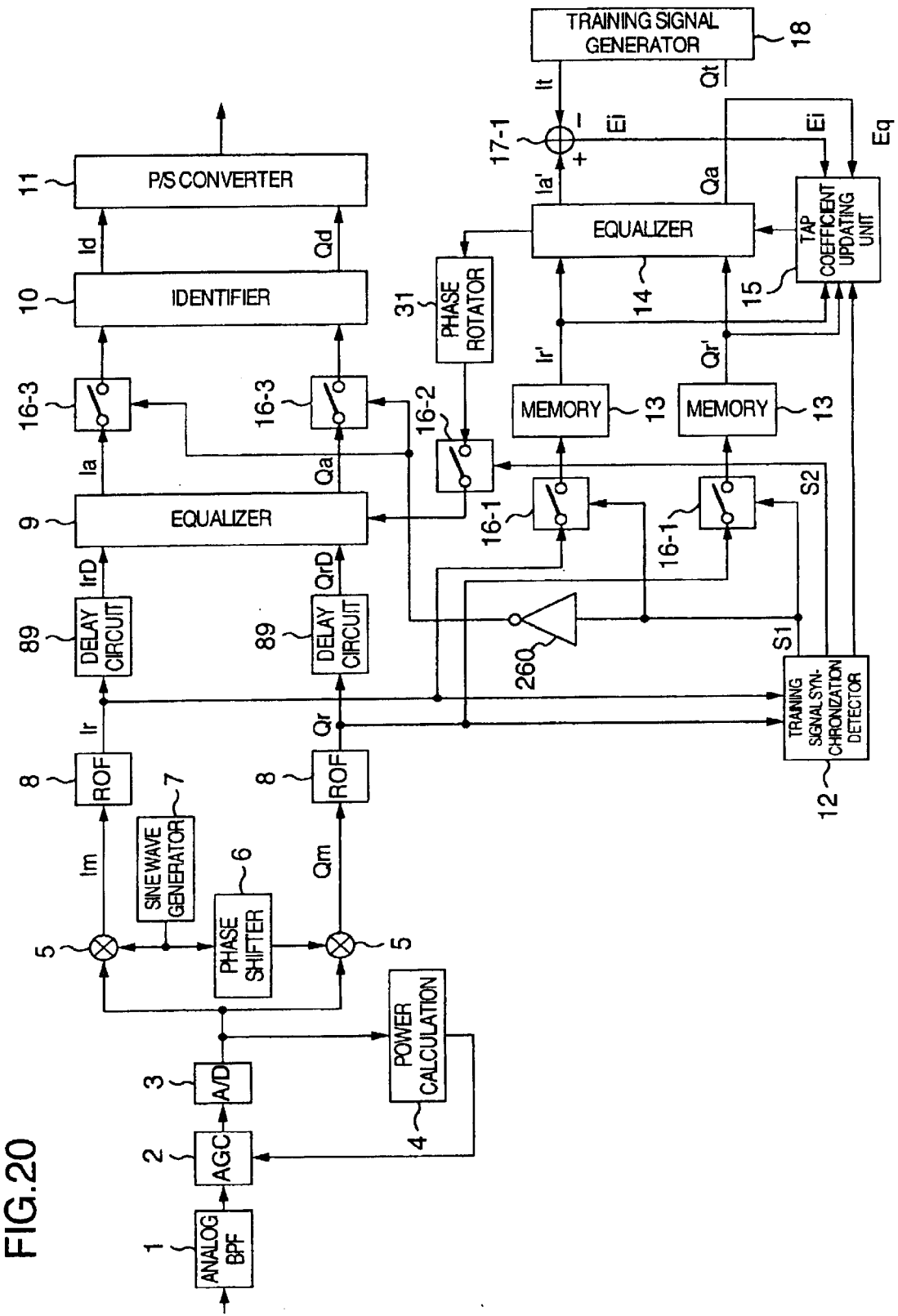
FIG. 20 is a block diagram of a demodulation circuit (reception circuit) according to another embodiment of the invention.

As a modification of the embodiment shown in FIG. 19, as shown in a reception circuit of FIG. 20, a delay circuit 89 may be added to the input side of the equalizer 9 similarly to the embodiment shown in FIG. 17.

As described above, according to the embodiments, only the in-phase or quadrature component of a reference training signal generated in the demodulator (receiver) is used for equalization convergence using a received training signal. With the reduced number of filtering calculations and tap coefficient updating calculations, the equalization function of the automatic evaluation circuit can be provided without lowering the circuit performance, and the circuit structure can be simplified. The process amount and the program size can be reduced if software is used for the equalization process, and the hardware circuit scale can be reduced if hardware is used.

Since the process time is shortened, a process heretofore unable to be executed in real time can be executed in real time. Even if the real time process is impossible, the follow-up performance of the automatic equalization circuit can be improved. Since the hardware circuit scale can be reduced, the circuit can be made compact and a small power consumption can be realized.

While the invention has been particularly described and shown with reference to the preferred embodiments thereof, it will be understood by those skilled in the art that various changes in form and detail and omissions may be made therein without departing from the scope of the invention.

What is claimed is:

1. An automatic equalization circuit for receiving a digital training signal and a digital data signal and outputting a digital data signal equalized, comprising;

a first automatic equalization unit including a first equalizer, to which said digital training signal and a digital data signal are applied, for equalizing said digital data signal;

a memory for storing said digital training signal;

a second automatic equalization unit coupled with said memory, for outputting an updating signal therefrom, said second automatic equalization unit comprising a second equalizer for outputting said updating signal, a training signal generator for outputting an either one of an in-phase component and a quadrature component signals of a training signal, the other one of which is zero, and a tap coefficient calculating unit coupled with said second equalizer, for outputting a tap coefficient value in comparison with said digital training signal from said memory and an output from said training signal generator and updating the tap coefficient of said second equalizer; and a phase rotator for rotating a phase of either one of an input signal and an output signal of said first automatic equalization unit, said digital training signal supplied to said memory and said updating signal outputted from said second equalizer, wherein said updating signal from said second equalizer is supplied to said first equalizer, so that a equalization characteristic of said first equalizer is updated.

2. An automatic equalization circuit according to claim 1, wherein a structure of said second equalizer has substantially the same structure as said first equalizer.

3. An automatic equalization circuit according to claim 1, wherein, said digital training signal and digital data signal are supplied to said first automatic equalization unit through a delay circuit, the delay time of which is predetermined.

4. An automatic equalization circuit according to claim 1, wherein said first and second equalizer are feedforward type equalizers and further comprising a third equalizer coupled with an output terminal of said first automatic equalization unit and a fourth equalizer coupled with said training signal generator, wherein said third and fourth equalizer are feedback type equalizers and an output from said fourth equalizer is applied to said third equalizer in order to update an equalization characteristic of said third equalizer.

5. An automatic equalization circuit according to claim 1, wherein said phase rotator is coupled between said first equalizer and said second equalizer to rotate the phase of said updating signal from said second equalizer.

6. An automatic equalization circuit according to claim 1, wherein said phase rotator is coupled with said memory, through which said input signal is supplied to said memory, so that the phase of said digital training signal to said memory is rotated.

7. An automatic equalization circuit according to claim 1, wherein said phase rotator is coupled with said first equalizer, through which said digital training signal and said digital data signal are supplied to said first equalizer.

8. An automatic equalization circuit according to claim 1, wherein said phase rotator is coupled with said first equalizer, through which said digital data signal from said first automatic equalization unit Is outputted.

9. An automatic equalization circuit according to claim 1, wherein said digital training signal is a signal corresponding to two signal points having an average power substantially equal to an average power of data signals having signal points on a data signal constellation plane.

10. A receiver circuit for reproducing a training signal and a data signal modulated by a digital multilevel modulation system, comprising:
   a signal processing unit, to which said training signal and a data signal are supplied, for producing a digital training signal and a digital data signal;
   a first automatic equalization unit including a first equalizer coupled with said signal processing unit, for equalizing said digital data signal, and outputting a digital data signal equalized;
   a memory coupled with said signal processing unit, for storing said digital training signal;
   a second automatic equalization unit coupled with said memory, for outputting an updating signal therefrom, said second automatic equalization unit comprising a second equalizer for outputting said updating signal, a training signal generator for outputting an either one of an in-phase component and a quadrature component signals of a training signal, the other one of which is zero, and a tap coefficient calculating unit coupled with said second equalizer, for outputting a tap coefficient value in comparison with said digital training signal from said memory and an output from said training signal generator and updating the tap coefficient of said second equalizer; and
   a phase rotator for rotating a phase of either one of an input signal and an output signal of said first automatic equalization unit, said digital training signal supplied to said memory and said updating signal outputted from said second equalizer,
   wherein said updating signal from said second equalizer is supplied to said first equalizer, so that a equalization characteristic of said first equalizer is updated.

11. A receiver circuit according to claim 10, wherein a structure of said second equalizer has substantially the same structure as said first equalizer.

12. A receiver circuit according to claim 10, further comprising:
   a delay circuit coupled between said signal processing unit and said first automatic equalization unit, the delay time of which is predetermined.

13. A receiver circuit according to claim 10, wherein said first and second equalizer are feedforward type equalizers and further comprising a third equalizer coupled with an output terminal of said first automatic equalization unit and a fourth equalizer coupled with said training signal generator, wherein said third and fourth equalizers are feedback type equalizers and an output from said fourth equalizer is applied to said third equalizer in order to update an equalization characteristic of said third equalizer.

14. A receiver circuit according to claim 10, wherein said phase rotator is coupled between said first and second equalizers to rotate the phase of said updating signal from said second equalizer.

15. A receiver circuit according to claim 10, wherein said phase rotator is coupled between said signal processing unit and said memory in order to rotate the phase of said digital training signal to said memory.

16. A receiver circuit according to claim 10, wherein said phase rotator is coupled between said signal processing unit and said first automatic equalization unit, and said digital training and data signals from said signal processing unit are supplied to said first automatic equalization unit through said phase rotator.

17. A receiver circuit according to claim 10, wherein said phase rotator is coupled with said first equalizer, through which said digital data signal from said first automatic equalization unit is outputted.

18. A receiver circuit according to claim 10, wherein said digital training signal is a signal corresponding to two signal points having an average power substantially equal to an average power of data signals having signal points on a data signal constellation plane.

* * * * *